(12) United States Patent
Chen et al.

(10) Patent No.: US 12,261,771 B2
(45) Date of Patent: Mar. 25, 2025

(54) APPARATUSES AND METHODS FOR RESTORATION OF A LABEL-SWITCHED PATH IN A NETWORK

(71) Applicant: HUAWEI TECHNOLOGIES CO., LTD., Guangdong (CN)

(72) Inventors: Yixiao Chen, Shenzhen (CN); Haoyu Feng, Shenzhen (CN); Kaixuan Yang, Shenzhen (CN); Gang Xie, Shenzhen (CN); Hao Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 17/705,998

(22) Filed: Mar. 28, 2022

(65) Prior Publication Data

US 2022/0224640 A1    Jul. 14, 2022

Related U.S. Application Data

(63) Continuation of application No. PCT/CN2020/078902, filed on Mar. 12, 2020.

(51) Int. Cl.
*H04L 45/28* (2022.01)
*H04L 45/50* (2022.01)

(52) U.S. Cl.
CPC .............. *H04L 45/50* (2013.01); *H04L 45/28* (2013.01)

(58) Field of Classification Search
CPC .......... H04L 45/50; H04L 45/28; H04L 40/36
See application file for complete search history.

(56) References Cited

U.S. PATENT DOCUMENTS 7,626,925 B1    12/2009  Sivabalan et al.
7,652,983 B1 *   1/2010  Li .......................... H04L 41/344
                                                                        709/239

(Continued)

FOREIGN PATENT DOCUMENTS

CN          101247354 A      8/2008
CN          102907051 A      1/2013

(Continued)

OTHER PUBLICATIONS

International Search Report of PCT/CN2020/078902; ISA/CN, Fandfang Bai; Dec. 10, 2020.

(Continued)

*Primary Examiner* — Hanh N Nguyen
(74) *Attorney, Agent, or Firm* — BCF LLP

(57) ABSTRACT

The disclosed apparatuses and methods are directed to data plane restoration in a network. A method comprises receiving a label-switched path (LSP) failure notification indicating a failure in a network; generating, by a node of the network, a fast-restoration (FR) message and transmitting the FR message to a second node of the message forwarding path. The FR message comprises: a plurality of forwarding instruction objects (FIOs) having forwarding instructions for the FR message for each node of a message forwarding path; and a plurality of label-switched path objects (LSPOs) having a restoration LSP data for each node of a protection detour path. Another method comprises receiving the FR message; generating a modified FR message based on the FR message; and transmitting the modified FR message to another node of the message forwarding path based on the FIO, prior to processing the FR message by the node.

19 Claims, 21 Drawing Sheets

(56) References Cited

U.S. PATENT DOCUMENTS

| | | | | |
|---|---|---|---|---|
| 2004/0109687 A1* | 6/2004 | Park | ................... | H04J 14/0227 |
| | | | | 398/57 |
| 2009/0232003 A1* | 9/2009 | Vasseur | .............. | H04L 12/4633 |
| | | | | 370/236.2 |
| 2017/0012895 A1* | 1/2017 | Zhao | ....................... | H04L 45/38 |
| 2021/0111991 A1* | 4/2021 | Vadera | ................... | H04L 45/50 |

FOREIGN PATENT DOCUMENTS

| | | |
|---|---|---|
| CN | 104718732 A | 6/2015 |
| CN | 110140331 A | 8/2019 |

OTHER PUBLICATIONS

Lang et al., RFC 4872, RSVP-TE Extensions in Support of End-to-End Generalized Multi-Protocol Label Switching (GMPLS) Recovery, Alcatel, May 2007.

Berger et al., RFC 4873, GMPLS Segment Recovery, Old Dog Consulting, May 2007.

Xian Zhang Haomian Zheng et al: "RSVP-TE Signaling Procedure for GMPLS Restoration and Resource Sharing-based LSP Setup/Teardown; draft-zhang-ccamp-gmpls-resource-sharing-proc-02.txt", Sep. 12, 2014, pp. 1-16, XP015101605, [retrieved on Sep. 12, 2014].

Supplementary European Search Report issued from the EPO in connection with the corresponding application No. EP 20924036.5 on Mar. 17, 2023.

\* cited by examiner

FORWARDING INSTRUCTION Object 400

| Byte# | Data in 8 bits of each Byte ||||||||
|---|---|---|---|---|---|---|---|---|
| | 7 | 6 | 5 | 4 | 3 | 2 | 1 | 0 |
| 0 | Object Length 410 ||||||||
| 1 | |||||||||
| 2 | Object Type (FORWARDING-INSTRUCTION) 412 ||||||||
| 2+1 | Forwarding Label (y bytes), which can be a global label or a local label known to a node 414 ||||||||
| 2+2 | |||||||||
| 2+3 | |||||||||
| ..... | |||||||||
| 2+y | |||||||||
| 2+y+1 | Action Flag (e.g. Forwarding only or Copy+Forwarding) 416 ||||||||

FIG. 4

LSP-DATA Object

| Byte# | Data in 8 bits of each Byte | | | | | | | |
|---|---|---|---|---|---|---|---|---|
| | 7 | 6 | 5 | 4 | 3 | 2 | 1 | 0 |
| 0 | Object Length 510 ||||||||
| 1 | |||||||||
| 2 | Object Type (LSP-DATA) 512 ||||||||
| 2+1 | Restortion LSP data (x bytes), e.g. Global Path Label (4 bytes) 514 ||||||||
| 2+2 | |||||||||
| ...... | |||||||||
| 2+x | |||||||||

| Byte# | Byte 7 6 5 4 3 2 1 0 |
|---|---|
| 0 | Object Length(36) |
| 1 | |
| 2 | Object Type (LSP-DATA) |
| 2+1 | Tunnel Id 1 |
| 2+2 | |
| 2+3 | LSP Id 1 (Protection LSP1) |
| 2+4 | |
| 2+5 | Central Frequency(W1) |
| 2+6 | |
| 2+7 | |
| 2+8 | |
| 2+9 | Frequency Bandwidth(50G Hz) |
| 2+10 | |
| 2+11 | NodeF ID |
| 2+12 | |
| 2+13 | |
| 2+14 | |
| 2+15 | Ingress Port/Link Id (L2) |
| 2+16 | |
| 2+17 | |
| 2+18 | |
| 2+19 | Egress Port/Link Id(L1) |
| 2+20 | |
| 2+21 | |
| 2+22 | |
| 2+23 | NodeB ID |
| 2+24 | |
| 2+25 | |
| 2+26 | |
| 2+27 | Ingress Port/Link Id (L1) |
| 2+28 | |
| 2+29 | |
| 2+30 | |
| 2+31 | Egress Port/Link Id (P1) |
| 2+32 | |
| 2+33 | |
| 2+34 | |

1002

| Byte# | Byte 7 6 5 4 3 2 1 0 |
|---|---|
| 0 | Object Length(36) |
| 1 | |
| 2 | Object Type (LSP-DATA) |
| 2+1 | Tunnel Id 2 |
| 2+2 | |
| 2+3 | LSP Id 2 (Protection LSP2) |
| 2+4 | |
| 2+5 | Central Frequency(W2) |
| 2+6 | |
| 2+7 | |
| 2+8 | |
| 2+9 | Frequency Bandwidth(50G Hz) |
| 2+10 | |
| 2+11 | NodeF ID |
| 2+12 | |
| 2+13 | |
| 2+14 | |
| 2+15 | Ingress Port/Link Id (L2) |
| 2+16 | |
| 2+17 | |
| 2+18 | |
| 2+19 | Egress Port/Link Id(L1) |
| 2+20 | |
| 2+21 | |
| 2+22 | |
| 2+23 | NodeB ID |
| 2+24 | |
| 2+25 | |
| 2+26 | |
| 2+27 | Ingress Port/Link Id (L1) |
| 2+28 | |
| 2+29 | |
| 2+30 | |
| 2+31 | Egress Port/Link Id (P2) |
| 2+32 | |
| 2+33 | |
| 2+34 | |

1003

Protection LSP1 LSP-Data Object

1101

| Byte# | Byte | | | | | | | |
|---|---|---|---|---|---|---|---|---|
| | 7 | 6 | 5 | 4 | 3 | 2 | 1 | 0 |
| 0 | Object Length(10) | | | | | | | |
| 1 | | | | | | | | |
| 2 | Object Type (LSP-DATA) | | | | | | | |
| 2+1 | LSP1 Global Id (Protection LSP1)<br><br>1103 | | | | | | | |
| 2+2 | | | | | | | | |
| 2+3 | | | | | | | | |
| 2+4 | | | | | | | | |
| 2+5 | | | | | | | | |
| 2+6 | | | | | | | | |
| 2+7 | | | | | | | | |
| 2+8 | | | | | | | | |

Protection LSP2 LSP-Data Object

1102

| Byte# | Byte | | | | | | | |
|---|---|---|---|---|---|---|---|---|
| | 7 | 6 | 5 | 4 | 3 | 2 | 1 | 0 |
| 0 | Object Length(10) | | | | | | | |
| 1 | | | | | | | | |
| 2 | Object Type (LSP-DATA) | | | | | | | |
| 2+1 | LSP2 Global Id (Protection LSP2)<br><br>1104 | | | | | | | |
| 2+2 | | | | | | | | |
| 2+3 | | | | | | | | |
| 2+4 | | | | | | | | |
| 2+5 | | | | | | | | |
| 2+6 | | | | | | | | |
| 2+7 | | | | | | | | |
| 2+8 | | | | | | | | |

| Byte# | Byte |||||||| |
|---|---|---|---|---|---|---|---|---|
| | 7 | 6 | 5 | 4 | 3 | 2 | 1 | 0 |
| 0 | Object Length (8) |||||||| |
| 1 | |||||||| |
| 2 | Object Type (INSTRUCTION) |||||||| |
| 2+1 | Local Label - Outgoing Local Interace C1 |||||||| |
| 2+2 | |||||||| |
| 2+3 | |||||||| |
| 2+4 | |||||||| |
| 2+4+1 | Action Flag (Copy+Forwarding) |||||||| |

FIG. 13

| Byte# | Byte | | | | | | | |
|---|---|---|---|---|---|---|---|---|
| | 7 | 6 | 5 | 4 | 3 | 2 | 1 | 0 |
| 0 | Length(104) | | | | | | | |
| 1 | | | | | | | | |
| 2 | Message Type (FAST-RESTORATION) | | | | | | | |
| 3 | VER | | | | | | | |
| 4 | Number of Instructions (n=3) | | | | | | | |
| 4+1 | Object Length (8) | | | | | | | |
| 4+2 | | | | | | | | |
| 4+3 | Object Type (INSTRUCTION) | | | | | | | |
| 4+4 | Local Label - Outgoing Local Interace C1 | | | | | | | |
| 4+5 | | | | | | | | |
| 4+6 | | | | | | | | |
| 4+7 | | | | | | | | |
| 4+8 | Action Flag (Forwarding) | | | | | | | |
| 4+8+1 | Object Length (8) | | | | | | | |
| 4+8+2 | | | | | | | | |
| 4+8+3 | Object Type (INSTRUCTION) | | | | | | | |
| 4+8+4 | Local Label - Outgoing Local Interace C1 | | | | | | | |
| 4+8+5 | | | | | | | | |
| 4+8+6 | | | | | | | | |
| 4+8+7 | | | | | | | | |
| 4+8+8 | Action Flag (Forwarding) | | | | | | | |
| 4+8*2+1 | Object Length (8) | | | | | | | |
| 4+8*2+2 | | | | | | | | |
| 4+8*2+3 | Object Type (INSTRUCTION) | | | | | | | |
| 4+8*2+4 | Local Label - Outgoing Local Interace C3 | | | | | | | |
| 4+8*2+5 | | | | | | | | |
| 4+8*2+6 | | | | | | | | |
| 4+8*2+7 | | | | | | | | |
| 4+8*2+8 | Action Flag (Copy+Forwarding) | | | | | | | |
| 4+3*8+1 = 29 | Number of Restoration LSPs (m=2) | | | | | | | |
| 29+1 | Object Length(37) | | | | | | | |
| 29+2 | | | | | | | | |
| 29+3 | Object Type (LSP-DATA) | | | | | | | |
| 29+4 | Tunnel Id 1 | | | | | | | |
| 29+5 | | | | | | | | |
| 29+6 | LSP Id 1 (Protection LSP1) | | | | | | | |
| 29+7 | | | | | | | | |
| 29+8 | Central Frequency(W1) | | | | | | | |
| 29+9 | | | | | | | | |
| 29+10 | | | | | | | | |
| 29+11 | | | | | | | | |
| 29+12 | Frequency Bandwidth(50G Hz) | | | | | | | |
| 29+13 | | | | | | | | |
| 29+14 | NodeF ID | | | | | | | |
| 29+15 | | | | | | | | |
| 29+16 | | | | | | | | |
| 29+17 | | | | | | | | |

| Offset | Field |
|---|---|
| 29+18 | |
| 29+19 | Ingress Port/Link Id (L2) |
| 29+20 | |
| 29+21 | |
| 29+22 | |
| 29+23 | Egress Port/Link Id(L1) |
| 29+24 | |
| 29+25 | |
| 29+26 | |
| 29+27 | NodeB ID |
| 29+28 | |
| 29+29 | |
| 29+30 | |
| 29+31 | Ingress Port/Link Id (L1) |
| 29+32 | |
| 29+33 | |
| 29+34 | |
| 29+35 | Egress Port/Link Id (P1) |
| 29+36 | |
| 29+37 | |
| 29+37+1 | Object Length(37) |
| 29+37+2 | |
| 29+37+3 | Object Type (LSP-DATA) |
| 29+37+4 | Tunnel Id 2 |
| 29+37+5 | |
| 29+37+6 | LSP Id 2 (Protection LSP2) |
| 29+37+7 | |
| 29+37+8 | |
| 29+37+9 | Central Frequency(W2) |
| 29+37+10 | |
| 29+37+11 | |
| 29+37+12 | Frequency Bandwidth(50G Hz) |
| 29+37+13 | |
| 29+37+14 | |
| 29+37+15 | NodeF ID |
| 29+37+16 | |
| 29+37+17 | |
| 29+37+18 | |
| 29+37+19 | Ingress Port/Link Id (L2) |
| 29+37+20 | |
| 29+37+21 | |
| 29+37+22 | |
| 29+37+23 | Egress Port/Link Id(L1) |
| 29+37+24 | |
| 29+37+25 | |
| 29+37+26 | |
| 29+37+27 | NodeB ID |
| 29+37+28 | |
| 29+37+29 | |
| 29+37+30 | |
| 29+37+31 | Ingress Port/Link Id (L1) |
| 29+37+32 | |
| 29+37+33 | |
| 29+37+34 | |
| 29+37+35 | Egress Port/Link Id (P2) |
| 29+37+36 | |
| 29+37+37 | |

| Byte# | Byte |||||||| |
|---|---|---|---|---|---|---|---|---|
| | 7 | 6 | 5 | 4 | 3 | 2 | 1 | 0 |
| 0 | Length(96) |||||||| |
| 1 | |||||||| |
| 2 | Message Type (FAST-RESTORATION) |||||||| |
| 3 | VER |||||||| |
| 4 | Number of Instructions (n=2) |||||||| |
| 4+1 | Object Length (8) |||||||| |
| 4+2 | |||||||| |
| 4+3 | Object Type (INSTRUCTION) |||||||| |
| 4+4 | Local Label - Outgoing Local Interace C1 |||||||| |
| 4+5 | |||||||| |
| 4+6 | |||||||| |
| 4+7 | |||||||| |
| 4+8 | Action Flag (Forwarding) |||||||| |
| 4+8+1 | Object Length (8) |||||||| |
| 4+8+2 | |||||||| |
| 4+8+3 | Object Type (INSTRUCTION) |||||||| |
| 4+8+4 | Local Label - Outgoing Local Interace C3 |||||||| |
| 4+8+5 | |||||||| |
| 4+8+6 | |||||||| |
| 4+8+7 | |||||||| |
| 4+8+8 | Action Flag (Copy+Forwarding) |||||||| |
| 4+2*8+1 = 21 | Number of Restoration LSPs (m=2) |||||||| |
| 21+1 | Object Length(37) |||||||| |
| 21+2 | |||||||| |
| 21+3 | Object Type (LSP-DATA) |||||||| |
| 21+4 | Tunnel Id 1 |||||||| |
| 21+5 | |||||||| |
| 21+6 | LSP Id 1 (Protection LSP1) |||||||| |
| 21+7 | |||||||| |
| 21+8 | Central Frequency(W1) |||||||| |
| 21+9 | |||||||| |
| 21+10 | |||||||| |
| 21+11 | |||||||| |
| 21+12 | Frequency Bandwidth(50G Hz) |||||||| |
| 21+13 | |||||||| |
| 21+14 | NodeF ID |||||||| |
| 21+15 | |||||||| |
| 21+16 | |||||||| |
| 21+17 | |||||||| |
| 21+18 | Ingress Port/Link Id (L2) |||||||| |
| 21+19 | |||||||| |
| 21+20 | |||||||| |
| 21+21 | |||||||| |
| 21+22 | Egress Port/Link Id(L1) |||||||| |
| 21+23 | |||||||| |
| 21+24 | |||||||| |
| 21+25 | |||||||| |

| Offset | Field |
|---|---|
| 21+26 | |
| 21+27 | NodeB ID |
| 21+28 | |
| 21+21 | |
| 21+30 | |
| 21+31 | Ingress Port/Link Id (L1) |
| 21+32 | |
| 21+33 | |
| 21+34 | |
| 21+35 | Egress Port/Link Id (P1) |
| 21+36 | |
| 21+37 | |
| 21+37+1 | Object Length(37) |
| 21+37+2 | |
| 21+37+3 | Object Type (LSP-DATA) |
| 21+37+4 | Tunnel Id 2 |
| 21+37+5 | |
| 21+37+6 | LSP Id 2 (Protection LSP2) |
| 21+37+7 | |
| 21+37+8 | |
| 21+37+9 | Central Frequency(W2) |
| 21+37+10 | |
| 21+37+11 | |
| 21+37+12 | Frequency Bandwidth(50G Hz) |
| 21+37+13 | |
| 21+37+14 | |
| 21+37+15 | NodeF ID |
| 21+37+16 | |
| 21+37+17 | |
| 21+37+18 | |
| 21+37+19 | Ingress Port/Link Id (L2) |
| 21+37+20 | |
| 21+37+21 | |
| 21+37+22 | |
| 21+37+23 | Egress Port/Link Id(L1) |
| 21+37+24 | |
| 21+37+25 | |
| 21+37+26 | |
| 21+37+27 | NodeB ID |
| 21+37+28 | |
| 21+37+21 | |
| 21+37+30 | |
| 21+37+31 | Ingress Port/Link Id (L1) |
| 21+37+32 | |
| 21+37+33 | |
| 21+37+34 | |
| 21+37+35 | Egress Port/Link Id (P2) |
| 21+37+36 | |
| 21+37+37 | |

| Byte# | Byte | | | | | | | |
|---|---|---|---|---|---|---|---|---|
| | 7 | 6 | 5 | 4 | 3 | 2 | 1 | 0 |
| 0 | Length(88) | | | | | | | |
| 1 | | | | | | | | |
| 2 | Message Type (FAST-RESTORATION) | | | | | | | |
| 3 | VER | | | | | | | |
| 4 | Number of Instructions (n=1) | | | | | | | |
| 4+1 | Object Length (8) | | | | | | | |
| 4+2 | | | | | | | | |
| 4+3 | Object Type (INSTRUCTION) | | | | | | | |
| 4+4 | Local Label - Outgoing Local Interace C3 | | | | | | | |
| 4+5 | | | | | | | | |
| 4+6 | | | | | | | | |
| 4+7 | | | | | | | | |
| 4+8 | Action Flag (Copy+Forwarding) | | | | | | | |
| 4+8+1 = 13 | Number of Restoration LSPs (m=2) | | | | | | | |
| 13+1 | Object Length(37) | | | | | | | |
| 13+2 | | | | | | | | |
| 13+3 | Object Type (LSP-DATA) | | | | | | | |
| 13+4 | Tunnel Id 1 | | | | | | | |
| 13+5 | | | | | | | | |
| 13+6 | LSP Id 1 (Protection LSP1) | | | | | | | |
| 13+7 | | | | | | | | |
| 13+8 | Central Frequency(W1) | | | | | | | |
| 13+9 | | | | | | | | |
| 13+10 | | | | | | | | |
| 13+11 | | | | | | | | |
| 13+12 | Frequency Bandwidth(50G Hz) | | | | | | | |
| 13+13 | | | | | | | | |
| 13+14 | NodeF ID | | | | | | | |
| 13+15 | | | | | | | | |
| 13+16 | | | | | | | | |
| 13+17 | | | | | | | | |
| 13+18 | Ingress Port/Link Id (L2) | | | | | | | |
| 13+19 | | | | | | | | |
| 13+20 | | | | | | | | |
| 13+13 | | | | | | | | |
| 13+22 | Egress Port/Link Id(L1) | | | | | | | |
| 13+23 | | | | | | | | |
| 13+24 | | | | | | | | |
| 13+25 | | | | | | | | |
| 13+26 | NodeB ID | | | | | | | |
| 13+27 | | | | | | | | |
| 13+28 | | | | | | | | |
| 13+13 | | | | | | | | |
| 13+30 | Ingress Port/Link Id (L1) | | | | | | | |
| 13+31 | | | | | | | | |
| 13+32 | | | | | | | | |
| 13+33 | | | | | | | | |

| | |
|---|---|
| 13+34 | Egress Port/Link Id (P1) |
| 13+35 | |
| 13+36 | |
| 13+37 | |
| 13+37+1 | Object Length(37) |
| 13+37+2 | |
| 13+37+3 | Object Type (LSP-DATA) |
| 13+37+4 | Tunnel Id 2 |
| 13+37+5 | |
| 13+37+6 | LSP Id 2 (Protection LSP2) |
| 13+37+7 | |
| 13+37+8 | Central Frequency(W2) |
| 13+37+9 | |
| 13+37+10 | |
| 13+37+11 | |
| 13+37+12 | Frequency Bandwidth(50G Hz) |
| 13+37+13 | |
| 13+37+14 | NodeF ID |
| 13+37+15 | |
| 13+37+16 | |
| 13+37+17 | |
| 13+37+18 | Ingress Port/Link Id (L2) |
| 13+37+19 | |
| 13+37+20 | |
| 13+37+13 | |
| 13+37+22 | Egress Port/Link Id(L1) |
| 13+37+23 | |
| 13+37+24 | |
| 13+37+25 | |
| 13+37+26 | NodeB ID |
| 13+37+27 | |
| 13+37+28 | |
| 13+37+13 | |
| 13+37+30 | Ingress Port/Link Id (L1) |
| 13+37+31 | |
| 13+37+32 | |
| 13+37+33 | |
| 13+37+34 | Egress Port/Link Id (P2) |
| 13+37+35 | |
| 13+37+36 | |
| 13+37+37 | |

| Byte# | Byte | | | | | | | |
|---|---|---|---|---|---|---|---|---|
| | 7 | 6 | 5 | 4 | 3 | 2 | 1 | 0 |
| 0 | Length(56) | | | | | | | |
| 1 | | | | | | | | |
| 2 | Message Type (FAST-RESTORATION) | | | | | | | |
| 3 | VER | | | | | | | |
| 4 | Number of Instructions (n=0) | | | | | | | |
| 4+1 = 5 | Number of Restoration LSPs (m=2) | | | | | | | |
| 5+1 | Object Length(25) | | | | | | | |
| 5+2 | | | | | | | | |
| 5+3 | Object Type (LSP-DATA) | | | | | | | |
| 5+4 | Tunnel Id 1 | | | | | | | |
| 5+5 | | | | | | | | |
| 5+6 | LSP Id 1 (Protection LSP1) | | | | | | | |
| 5+7 | | | | | | | | |
| 5+8 | Central Frequency(W1) | | | | | | | |
| 5+9 | | | | | | | | |
| 5+10 | | | | | | | | |
| 5+11 | | | | | | | | |
| 5+12 | Frequency Bandwidth(50G Hz) | | | | | | | |
| 5+13 | | | | | | | | |
| 5+14 | NodeB ID | | | | | | | |
| 5+15 | | | | | | | | |
| 5+16 | | | | | | | | |
| 5+17 | | | | | | | | |
| 5+18 | Ingress Port/Link Id (L1) | | | | | | | |
| 5+19 | | | | | | | | |
| 5+20 | | | | | | | | |
| 5+21 | | | | | | | | |
| 5+22 | Egress Port/Link Id (P1) | | | | | | | |
| 5+23 | | | | | | | | |
| 5+24 | | | | | | | | |
| 5+25 | | | | | | | | |
| 5+25+1 | Object Length(25) | | | | | | | |
| 5+25+2 | | | | | | | | |
| 5+25+3 | Object Type (LSP-DATA) | | | | | | | |
| 5+25+4 | Tunnel Id 2 | | | | | | | |
| 5+25+5 | | | | | | | | |
| 5+25+6 | LSP Id 2 (Protection LSP2) | | | | | | | |
| 5+25+7 | | | | | | | | |
| 5+25+8 | Central Frequency(W2) | | | | | | | |
| 5+25+9 | | | | | | | | |
| 5+25+10 | | | | | | | | |
| 5+25+11 | | | | | | | | |
| 5+25+12 | Frequency Bandwidth(50G Hz) | | | | | | | |
| 5+25+13 | | | | | | | | |
| 5+25+14 | NodeB ID | | | | | | | |
| 5+25+15 | | | | | | | | |
| 5+25+16 | | | | | | | | |
| 5+25+17 | | | | | | | | |
| 5+25+18 | Ingress Port/Link Id (L1) | | | | | | | |
| 5+25+19 | | | | | | | | |
| 5+25+20 | | | | | | | | |
| 5+25+21 | | | | | | | | |
| 5+25+22 | Egress Port/Link Id (P2) | | | | | | | |
| 5+25+23 | | | | | | | | |
| 5+25+24 | | | | | | | | |
| 5+25+25 | | | | | | | | |

APPARATUSES AND METHODS FOR RESTORATION OF A LABEL-SWITCHED PATH IN A NETWORK

CROSS-REFERENCE TO RELATED APPLICATIONS

The present application claims priority from International Patent Application No PCT/CN2020/078902, filed on Mar. 20, 2020, the disclosure of which is incorporated by reference herein in its entirety.

FIELD OF THE INVENTION

The present invention generally relates to the field of communications and, in particular, to restoration of a label-switched path in a network.

BACKGROUND

In a telecommunication network, nodes and links form a network topology, and the links provide interconnections between the nodes. An automatically switched optical network (ASON) has a dynamic policy-driven control and an automatic management of ASON's resources and connections.

A logical architecture of an ASON may be divided into three planes: a data plane (which may also be referred to as a "transport plane"), a control plane, and a management plane. The data plane has switches responsible for transporting user data via connections. These switches are connected to each other via the links.

The control plane is responsible for the resource and connection management within ASON. The control plane usually has a series of optical connection controllers which may provide various functions, such as network topology discovery, signaling, routing, connection set-up and teardown, connection protection and restoration, traffic engineering, and wavelength assignment.

The management plane is responsible for managing the control plane. The management plane manages configurations of the control plane resources, routing areas, transport resources in the control plane and the policies. The management plane may also provide fault management, performance management, as well as accounting and security management functions.

A multi-protocol label switching (MPLS) routing technique in a network directs the data from one node to another node by using path labels. The path labels identify paths between two distant nodes, rather than destination points of the data.

A generalized multi-protocol label switching (GMPLS) routing technique is based on the MPLS routing technique. The GMPLS technique supports, for example, Layer-2 Switch Capable (L2SC) interface, Time-Division Multiplex (TDM) interface, Lambda Switch Capable (LSC) interface, and Fiber Switch Capable (FSC) interface. In order to support a recovery of a failed network, GMPLS recovery technique uses control plane mechanisms, such as, for example, signaling, routing, and link management mechanisms.

A label-switched path (LSP) may be defined as a predetermined path that a packet follows when it is transmitted through an ASON network with GMPLS. In the event of a network failure, all affected LSPs and the data plane need to be restored as soon as possible. Currently used restoration techniques, such as, for example, a Resource ReSerVation Protocol-Traffic Engineering (RSVP-TE), are time- and resource-consuming.

SUMMARY

An object of the present disclosure is to provide systems, methods and apparatuses, such as nodes, systems for improved restoration of label-switched path (LSP) in networks. In particular, the systems, methods and apparatuses may be implemented in an automatically switched optical network (ASON) with generalized multi-protocol label switching (GMPLS).

In accordance with this objective, an aspect of the present disclosure provides a node comprising: a non-transitory storage medium storing instructions; and a processor configured to execute the instructions and, when executing the instructions, configured to: receive a label-switched path (LSP) failure notification; generate a fast-restoration (FR) message comprising: a plurality of forwarding instruction objects (FIOs) having forwarding instructions related to each node of a message forwarding path; and a plurality of label-switched path objects (LSPOs) having a restoration label-switched path (LSP) data for each node of a protection detour path, nodes of the message forwarding path comprising nodes of the protection detour path. The processor is further configured to transmit the FR message to another node of the message forwarding path.

In at least one embodiment, the processor is further configured to, prior to generating the FR message, determine each node of the protection detour path and determine each node of the message forwarding path.

The processor may be further configured to, prior to generating the FR message: generate the plurality of FIOs; and generate a plurality of LSPOs.

The node may further comprise a forwarding instruction database comprising forwarding data; an LSP database comprising restoration LSP data. The processor, when executing the instructions, may be further configured to: access the forwarding instruction database to generate the plurality of FIOs; and access the LSP database to generate the plurality of LSPOs.

In accordance with another aspect of the present disclosure, there is provided a node comprising: a non-transitory storage medium storing instructions and a processor configured to execute the instructions and, when executing the instructions, configured to: receive a fast-restoration (FR) message, the FR message comprising: a plurality of FIOs having a first FIO, the first FIO having forwarding instructions of the FR message from the node to another node of a message forwarding path; and a plurality of LSPOs, each LSPO having a restoration LSP data for each node of a protection detour path, nodes of the message forwarding path comprising nodes of the protection detour path. In at least one embodiment, the processor is further configured to generate a modified FR message based on the FR message; and transmit the modified FR message to another node of the message forwarding path based on the first FIO located in the FR message.

The processor may be further configured to, after transmitting the modified FR message to another node of the message forwarding path: process the FR message to restore LSPs related to the node based on the restoration LSP data in the plurality of LSPOs.

The processor may be further configured to, prior to generating the modified FR message: copy the FR message to a node message storage and, prior to processing the FR message, retrieve the FR message from the node message storage.

The processor may be further configured to generate the modified FR message by removing from the FR message the first FIO related to the node. The modified FR message may comprise a modified plurality of FIOs, the modified plurality of FIOs excluding the first FIO.

In accordance with another aspect of the present disclosure, there is provided a method comprising: receiving a LSP failure notification indicating a failure in a network; generating, by a node of the network, a FR message comprising: a plurality of FIOs having forwarding instructions for the FR message for each node of a message forwarding path; a plurality of LSPOs having a restoration LSP data for each node of a protection detour path, nodes of the message forwarding path comprising nodes of the protection detour path. In at least one embodiment, the method further comprises transmitting the FR message to a second computing node of the message forwarding path.

In at least one embodiment, the method further comprises, prior to generating the FR message, determining each node of a protection detour path and determining each node of a message forwarding path.

In accordance with another aspect of the present disclosure, there is provided another method comprising: receiving the FR message by a node of a network, the FR message comprising: a plurality of FIOs having a first FIO, the first FIO having forwarding instructions for the FR message from the node to another node of a message forwarding path; a plurality of LSPOs each LSPO having a restoration LSP data for each node of a protection detour path, nodes of the message forwarding path comprising nodes of the protection detour path. In at least one embodiment, the method further comprises generating a modified FR message based on the FR message; and transmitting the modified FR message to another node of the message forwarding path based on a first FIO located in the FR message.

In at least one embodiment, the method further comprises, after transmitting the modified FR message to another node of the message forwarding path: processing the FR message to restore LSPs related to the node based on the restoration LSP data in the plurality of LSPOs.

In at least one embodiment, processing of the FR message to restore the LSPs on the node further may comprise establishing at least one cross-connect on a data plane of the node. The method may further comprise copying the FR message to the node message storage prior to generating the modified FR message. Generating the modified FR message may further comprise removing, from the FR message, the first FIO related to the node.

In at least one embodiment, each FIO of the plurality of FIOs of the FR message comprises an action flag indicating whether the data of FR message should be processed by each node of the message forwarding path.

In at least one embodiment, the FR message may further comprise: a header comprising a FR message length value, a FR message type identifier, and a FR message version identifier. The FR message may further comprise a value of a number of FIOs of the plurality of FIOs; and a value of a number of LSPOs of the plurality of LSPOs.

The number of FIOs in the FR message may be equal to a number of the nodes in the message forwarding path. The number of LSPOs may be equal to a number of LSPs to be restored at each node of the protection detour path.

Each FIO of the plurality of FIOs of the FR message may comprise: a FIO length value, a FIO type identifier, a forwarding label, and an action flag. Each FIO may further comprise an action flag indicating whether the FR message should be processed by the node. Each LSPO of the plurality of LSPOs of the FR message may comprise: an LSPO length value, an LSPO type identifier, and a restoration LSP data.

The node and the other nodes of the protection detour path may operate an optical network, and the number of LSPOs in the FR message may be equal to a number of optical channels of the optical network.

Implementations of the present disclosure each have at least one of the above-mentioned objects and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which:

FIG. 4 depicts a non-limiting example of a forwarding instruction object (FIO) of the FR message of FIG. 3, in accordance with various embodiments of the present disclosure;

FIG. 5 depicts a non-limiting example of a label-switched path object (LSPO) of the FR message of FIG. 3, in accordance with various embodiments of the present disclosure;

FIG. 10 depicts two non-limiting examples of LSPO, in accordance with various embodiments of the present disclosure;

FIG. 11 depicts two alternative non-limiting examples of LSPO, in accordance with various embodiments of the present disclosure;

FIG. 13 depicts an example of FIO of the FR message for one node, in accordance with various embodiments of the present disclosure;

FIG. 15A depicts a non-limiting example of a first FR message generated by one node of the optical network of FIG. 9, in accordance with various embodiments of the present disclosure;

FIG. 15B depicts a non-limiting example of a second FR message generated by another node of the optical network of FIG. 9, in accordance with various embodiments of the present disclosure;

FIG. 15C depicts a non-limiting example of a third FR message generated by yet another node of the optical network of FIG. 9, in accordance with various embodiments of the present disclosure; and FIG. 15D depicts a non-limiting example of a fourth FR message generated by yet another node of the optical network of FIG. 9, in accordance with various embodiments of the present disclosure.

Figure 1:
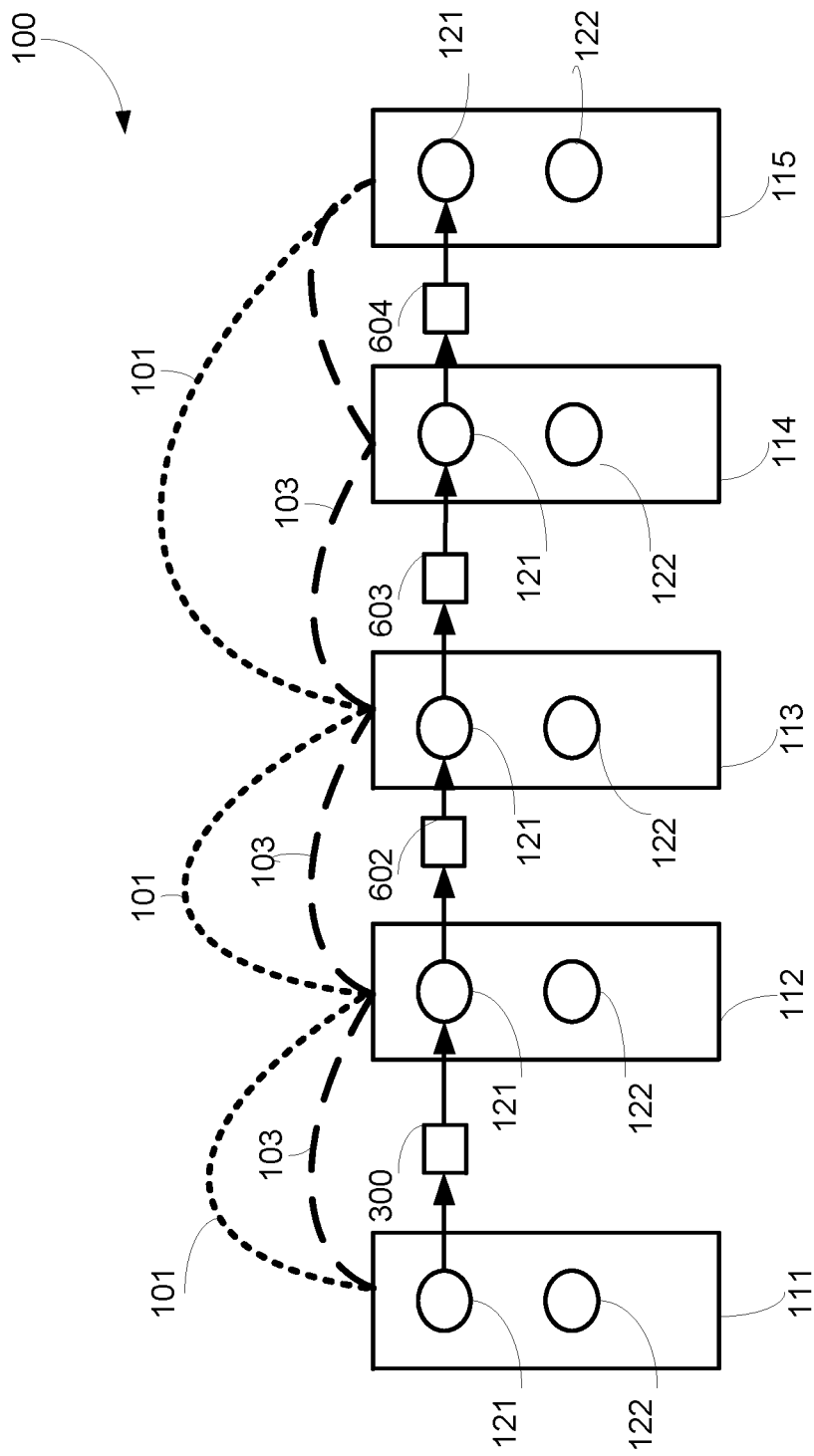
FIG. 1 depicts a portion of a telecommunication network having several nodes which are suitable to implement methods as described herein, in accordance with various embodiment of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes apparatuses and methods for an improved restoration of a label-switched path (LSP) in an automatically switched optical network (ASON) with generalized multi-protocol label switching (GMPLS). The ASON with GMPLS is also referred to herein as a "GMPLS network".

As referred to herein, the term "node" refers to a node in a GMPLS network. The node is a hardware element that may be configured to operate by executable instructions, as discussed further below. The node may be, for example, a layer-2 switch, an optical transport networking (OTN) switch or a lambda switch. In the GMPLS network, nodes are connected to each other by links. As referred to herein, the term "link" refers to a hardware that provides connections between the nodes. As referred to herein, the term "number of hops" refers to a number of intermediate devices (such as nodes) through which data passes when it is being transmitted between two nodes of the network.

An LSP is a predetermined path that a data packet follows when transmitted through a GMPLS network. The LSP may be also defined as a sequence of nodes (such as, for example, label switch routers) that transmit a packet of data within a GMPLS network. As used herein, the term "working LSP" refers to an LSP that is used during regular operation of GMPLS network.

A failure of one or more nodes and/or one or more links of a network (which may have many causes) may lead to a network failure. The network failure may affect one or more LSPs and therefore may interrupt or otherwise damage transmission of data between at least two nodes of the network.

In order to restore data transmission in the data plane in such failed network, all LSPs that were affected by the network failure need to be restored. Restoring LSPs comprises restoring cross-connections on the data plane of the nodes that were affected by the network failure. Generally, it is desirable that the restoration be accomplished promptly and efficiently.

The term "protection LSP" refers to an LSP that is used to transport user traffic in the event of the network failure and when the working LSP is not available. Resource ReSerVation Protocol-Traffic Engineering (RSVP-TE) is a most popular GMPLS signaling protocol. RSVP-TE typically uses a PATH message and an RESV message for the protection LSP setup. However, use of RSVP-TE messages for LSP restoration has limitations.

GMPLS network uses an internet protocol (IP) to communicate between different components in the control plane. In the event of a network failure, it may take several seconds for an IP-based signaling communications network to reach a state of routing convergence. The state of routing convergence as referred to herein is a state of nodes of a network where all nodes of the network have the same information about a topology of the network. Until the nodes of the network have the same information about the network's topology, RSVP-TE messages can be lost, because RSVP-TE messages do not specify how to forward the message from one node to another. If a RSVP-TE message is lost, the network continues to be unrestored until the next RSVP-TE message arrives to all node(s) to complete restoration of the LSP.

Furthermore, in order to restore LSPs in the failed network, one RSVP-TE message needs to be transmitted for each protection LSP setup. Therefore, in order to restore transmission of data in N optical channels between one source node and one destination node, N protection LSPs need to be restored. Such N protection LSPs would require N RSVP-TE messages.

Moreover, an overall time delay needed to restore all LSPs affected by network failure using RSVP-TE messages may be too long for some applications. Such overall time delay depends on a sum of the overall message processing time and the overall message transmission time of the RSVP-TE messages between the source node and the destination node.

The overall message transmission time for 80 RSVP-TE PATH messages with 20 hops over 5 megabits per second (Mbits/s) control channel may be about 3.8 seconds from the source node to the destination node of the protection LSP. In addition, each RSVP-TE PATH message needs to be processed after it has been received by each node of the protection LSP. Each node processes the RSVP-TE PATH message, validates a resource and updates the RSVP-TE PATH "Soft State". For example, a processing time of RSVP-TE PATH message at one node may be about 15 milliseconds (ms). RSVP-TE PATH message may be transmitted to another node only after the RSVP-TE PATH message has been processed by the current node, therefore delaying the restoration of LSPs.

In order to improve consumer and provider experiences, network operators are striving to reduce the overall time delay needed to restore the LSPs that have been affected by a network failure.

The apparatuses, systems and methods as described herein permit reducing the time of restoration of LSPs affected by a network failure. The nodes as described herein are configured to generate and process a fast-restoration (FR) message.

The FR message as described herein is forwarded with explicit forwarding instructions via a message forwarding path. The explicit forwarding instructions ensure delivery of the FR message to each node along the message forwarding path.

A protection detour path may comprise one or more protection LSPs which include the same network nodes. In other words, the protection detour path is a path through the GMPLS network which comprises a sequence of nodes that need to receive and process the FR message in order to restore LSPs. The message forwarding path may be different from the protection detour path. The message forwarding path comprises all nodes of the protection detour path and may also comprise one or more other nodes.

One FR message may comprise data that may be used for the restoration of many network LSPs. In other words, a single FR message may comprise data related to many protection LSPs, when such protection LSPs include the same network nodes.

The structure of the FR message as described herein permits avoiding a loss of the FR message even in the presence of slow routing convergence. Due to efficient transmission of the FR message by nodes and due to processing of the FR message at the nodes, which is subsequent or simultaneous to the transmission of the FR message, restoration of data transmission in the data plane of the network may be accelerated.

After successful restoration of LSPs by using the FR message as described herein, the control plane and the data plane may be synchronized in order to restore the whole network. Such synchronization of the control plane and the data plane may be performed, for example, by the conventional RSVP-TE PATH message.

FIG. 1 depicts a portion 100 of a telecommunication network having several nodes which are suitable to implement methods as described herein, in accordance with various embodiment of the present technology.

Each one of nodes 111, 112, 113, 114, 115 comprises a processor 121 and a non-transitory storage medium 122 storing instructions executable by the processor 121.

A protection detour path 101 comprises nodes 111, 112, 113, 115. Node 111 may be also referred to as a "source node" 111 of protection detour path 101. Node 115 may be also referred to as a "destination node" of the protection detour path 101. The source node 111 is configured to generate a first FR message 300. In other words, when the instructions are executed by the processor 121 of source node 111, the processor 121 of source node 111 is configured to generate first FR message 300.

The protection detour path 101 is defined in the data plane. The FR message is transmitted through the control plane of the network. In some embodiments, nodes of the control plane may be different from the data plane. A message forwarding path 103, located in the control plane, comprises all nodes of the protection detour path 101 and may also comprise additional nodes.

In FIG. 1, message forwarding path 103, located in the control plane, comprises nodes 111, 112, 113, 114, and 115. In other words, the message forwarding path 103 comprises all nodes of protection detour path 101, as well as an intermediate node 114 (which may be also referred to as "control plane node" 114). The message forwarding path 103 may be also referred to as a "control plane path" 103.

The source node 111 generates a FR message 300 (also referred to herein as a "first message" 300). Node 112 receives first FR message 300 and generates a second FR message 602 based on the first FR message 300 as described herein below. Node 113 is configured to generate a third FR message 603 based on the second FR message 602 as described herein below. Node 113 transmits third FR message 603 to node 114.

Control plane node 114 receives and forwards the third FR message 603 without processing it, to node 115. The control plane node 114 may generate a fourth FR message 604 based on third FR message 603 and then transmit the fourth FR message 604 to node 115.

Nodes 112, 113, and destination node 115 of protection detour path 101 are configured to process, as described herein, FR messages 300 and 602, 604, respectively. In other words, processors 121 of the nodes 112, 113, 115 of the protection detour path 101 are configured to process FR messages 300, 602, 604, respectively, as described below.

Figure 2:
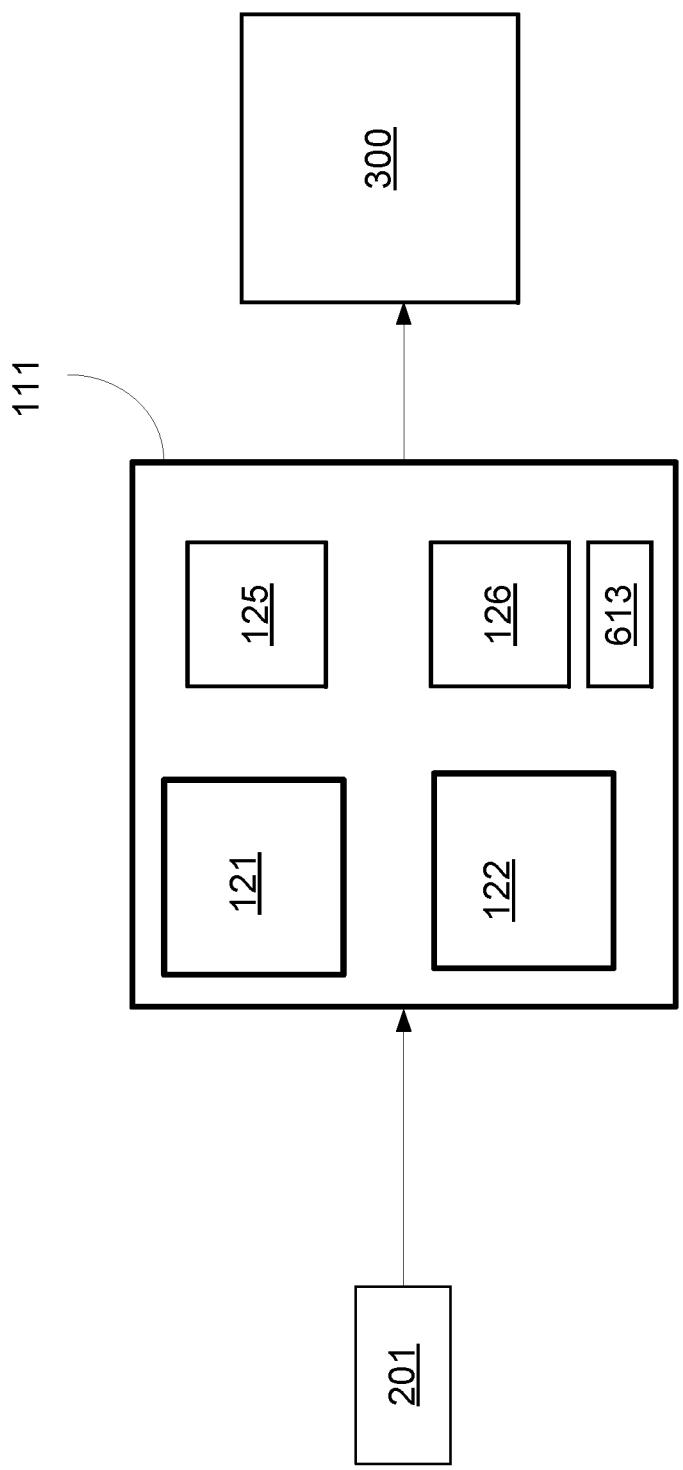
FIG. 2 depicts one node of FIG. 1, in accordance with various embodiment of the present technology.

FIG. 2 depicts source node 111 of FIG. 1, in accordance with various embodiment of the present technology. In addition to processor 121 and non-transitory storage medium 122, source node 111 may also comprise a forwarding instruction database 125 and an LSP database 126. The forwarding instruction database 125 may comprise message forwarding data, such as forwarding labels. The forwarding label may be, for example, a global label or a local label known to the node at which the label is meant to be processed. The LSP database 126 comprises restoration LSP data, such as, for example, a global path label.

In the event of the network failure, source node 111 receives a notice, such as, for example, a LSP failure notification 201. After source node 111 receives the LSP failure notification 201, source node 111 generates FR message 300.

Figure 3:
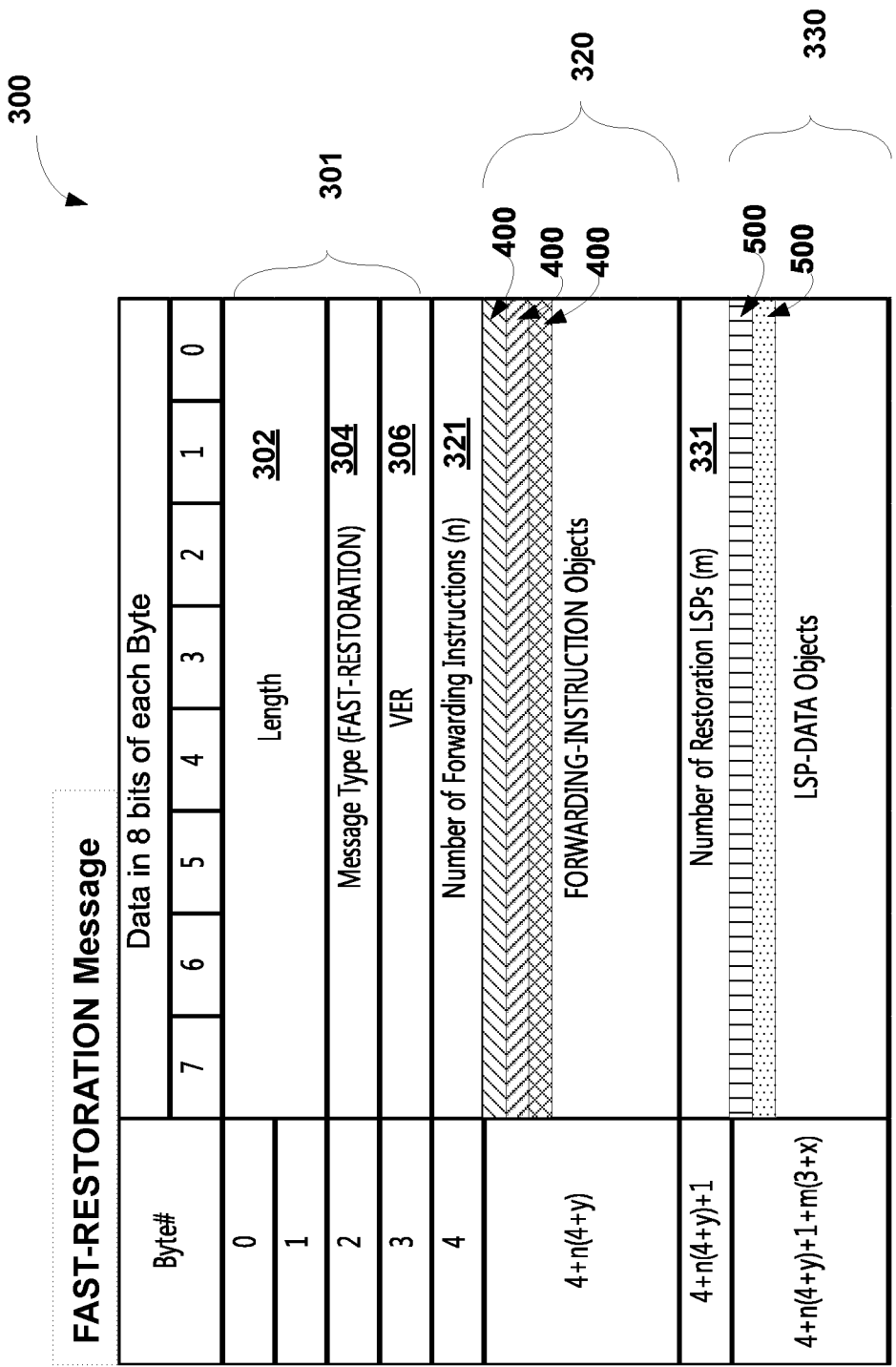
FIG. 3 depicts a non-limiting example of a fast-restoration (FR) message, in accordance with various embodiments of the present disclosure.

FIG. 3 depicts a non-limiting example of FR message 300, in accordance with various embodiments of the present disclosure. The FR message 300 comprises a FR message header 301, a list of forwarding instruction objects (FIOs) 320, and a list of label-switched path objects (LSPOs) 330. In some embodiments, the list of FIOs 320 may have one element. In some embodiments, the list of LSPOs 330 may have one element.

The FR message header 301 comprises: a FR message length value 302, a FR message type identifier 304, a FR message version identifier 306. In some embodiments, FR message length value 302 may occupy two bytes of data. FR message type identifier 304 may indicate a message type. The FR message type identifier 304 may be, for example, "FAST RESTORATION". Such message type identifier 304 may indicate to the nodes of the protection detour path 101 that FP message 300 needs to be processed by the node's processor 121 as the FR message as described herein. In some embodiments, FR message length value 301 may precede FR message type identifier 304. The FR message type identifier 304 may occupy 1 byte.

In some embodiments, FR message 300 may also comprise a number (n) of forwarding instruction objects (FIOs) 321, and a number (m) of restoration LSP objects 331.

The number (n) of FIOs 321 may be defined by the number of nodes FR message 300 needs to be forwarded from when transmitted via message forwarding path 103, in order to set up the protection detour path 101 and restore LSPs of the network. In other words, the number n of FIO may correspond to a number of nodes in the message forwarding path 103.

FIG. 4 depicts a non-limiting example of the forwarding instruction object (FIO) 400 of the first FR message 300, in accordance with various embodiments of the present disclosure. The FIO 400 comprises data with forwarding details of the FR message 300 by the nodes in protection detour path 101.

Referring also to FIGS. 1-3, a list 320 of FIOs 400 allows the FR message to be forwarded via the nodes of message forwarding path 103 specified in the FR message 300. "Forwarding of the FR message" or "propagation of the FR message" as referred to herein comprises forwarding of the first, second, third and fourth FR messages 300, 602, 603, 604, respectively, via the message forwarding path 103.

The protection detour path 101 is specified in FIO 400 by labels. Due to the FIOs, the data comprised in the FR message 300 may be guaranteed to be delivered to and received by each node on the protection detour path 101. Without forwarding instructions, the FR message would be lost because of slow routing convergence caused by network failures and topology changes.

Each FIO 400 comprises a FIO length value 410, a FIO type identifier 412, and a forwarding label 414. In some embodiments, FIO 400 may also have an action flag 416.

The FIO length value 410 indicates a combined length of the information of the FIO 400. The FIO length value 410 may occupy, for example, two bytes.

The FIO type identifier 412 may be, for example, "FORWARDING INSTRUCTION". The FIO type identifier 412 may occupy, for example, 1 byte.

The forwarding label 414 may be, for example, a global label or a local label known to the node that executes the forwarding instructions. The forwarding label 414 may occupy, for example, y bytes, where y is an integer. For example, y may be equal to 8 bytes, including 4 bytes of a node identifier (ID) and 4 bytes of a link ID.

An action flag 416 may indicate an action that a current node needs to perform when it receives FR message 300. For example, the action flag may indicate whether the respective FR message needs to be processed at the current node. For example, an action flag specific to the current node may be a string "Forward". The string "Forward" may indicate that the received FR message needs to be forwarded by the current node to another node without processing. Alternatively, the action flag specific to the current node may be another string "Copy and Forward". The string "Copy and Forward" may indicate, for example, that the respective FR message received by the current node needs to be copied by the current node, then forwarded to another node, and then processed by the current node, after the FR message 300 has been forwarded to the another node. The action flag may occupy, for example, 1 byte.

In some embodiments, FIO 400 may have no action flag 416. For example, a default action may be "Copy and Forward" and it may be known to the node that reads FIO 400. The node that reads FIO 400 may be pre-configured to copy and forward the message if FIO 400 does not have any action flag 416.

As it is depicted in FIG. 4, each FIO 400 may occupy (4+y) bytes, where y is the number of bytes of the forwarding label 414. Referring also to FIG. 3, FR message 300 comprises FIOs 400 for each node on the protection detour path 101. The list 320 of n FIOs may thus occupy n(4+y) bytes in the FR message 300.

In addition to FIOs 400, FR message 300 also comprises a list 330 of LSPOs as described herein below.

FIG. 5 depicts a non-limiting example of a LSPO 500, in accordance with various embodiments of the present disclosure. LSPO may also be referred to as "LSP-data object".

One LSPO 500 comprises a restoration LSP data for one of nodes 112, 113, 115 on the protection detour path 101. Referring also to FIG. 3, a single FR message 300 comprises a plurality of protection LSP data objects, such as, for example, LSP global labels.

Due to transmission of multiple LSPOs through one protection detour path 101, protection detour LSPs may be restored using a single FR message 300 signaling for the LSPs which have the same node path. Thus one FR message 300 may be used to set up multiple protection detour LSPs if they are located on one protection detour path 101.

The LSPO 500 comprises an LSPO length value 510, an LSPO type identifier 512, and a restoration LSP data 514.

The LSPO length value 510 indicates a combined length of the information of the LSPO. The LSPO length value 510 may occupy, for example, two bytes. The LSPO type identifier 512 may be, for example, "LSP-DATA" type. The LSPO type identifier 512 may occupy, for example, one byte.

The restoration LSP data 514 may be, for example, a global path label. The restoration LSP data may occupy, for example, x bytes, where x is an integer. For example, the global path label may occupy 4 bytes. In this non-limiting example, each LSPO 500 may occupy 3+x bytes. For example, a global path label may occupy 6 bytes, including 4 bytes of a node ID and 2 bytes of a local LSP index.

Referring now to FIG. 3, FR message 300 may comprise a value of number m of restoration LSPs 331, where m is an integer. The number of restoration LSPs 331 may depend on the number of restoration paths (in other terms, protection detour paths). For example, there may be 80 restoration paths for 80 dense wavelength division multiplexing (DWDM) optical channels. For example, the value of number m of restoration LSPs may occupy 1 byte.

The list 330 of LSPOs may follow the value of number m of restoration LSPs in the FR message 300. For example, for an optical network, a number of LSPOs in the FR message may be equal to a number of optical channels of the optical network.

Figure 6:
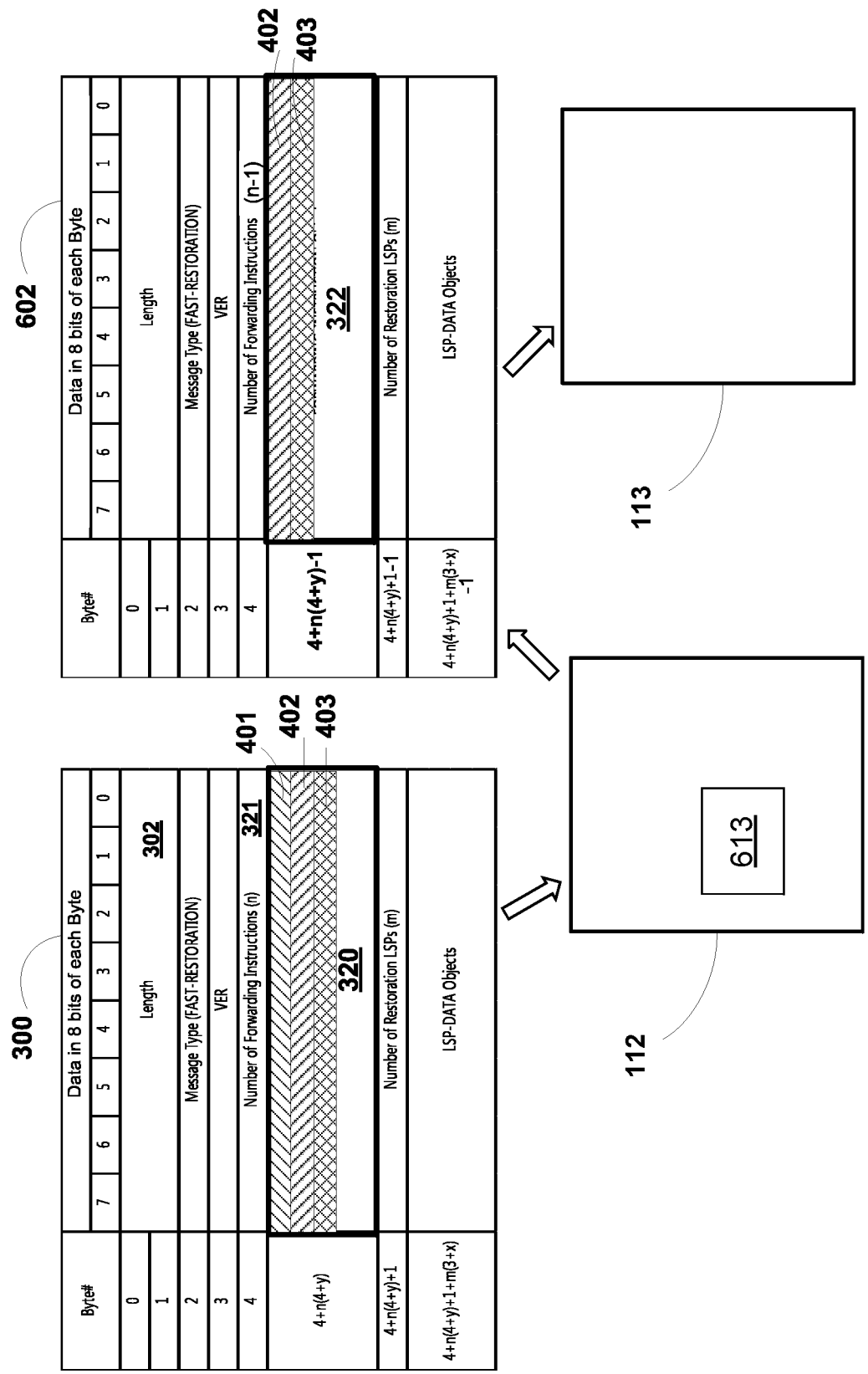
FIG. 6 depicts the FR message before being received by a node and a modified FR message is generated by the node and is transmitted to another node, in accordance with various embodiments of the present disclosure.

FIG. 6 depicts FR message 300 (also referred to herein as the "first FR message 300") before being received by node 112 and a modified FR message 602 (also referred to herein as the "second FR message 602") that has been generated by node 112 based on FR message 300, in accordance with various embodiments of the present disclosure.

In FIG. 6, list of FIOs 320 of first FR message 300 comprises a first FIO 401, a second FIO 402, and a third FIO 403. Referring also to FIGS. 1 and 4, each FIO 401, 402, 403 has a structure as described above for FIO 400, with forwarding instructions specific to nodes 112, 113, 114, respectively.

After node 112 receives first FR message 300, its processor 121 reads first FIO 401 located in a first position of a list of FIOs 320. With reference also to FIG. 4, if action flag 416 is present in FIO 400, and the action flag 416 specifies "Copy and Forward", the node 112 copies the FR message 300, for example, to a node message storage 613. Processor 121 of node 112 then generates second FR message 602 and forwards (transmits) the second FR message 602 to node 113. Alternatively, if FR message does not have any action flag 416, node 112 may, by default, copy FR message 300, generate second FR message 602, and then forward second FR message 602 to node 113.

Action flag 416 may specify only "forward", without "copy". In such embodiments, node 112 does not copy FR message 300, but generates the second FR message and forwards second FR message to node 113.

The second FR message 602 has all fields of first FR message 300 except for a first FIO 401 that is removed by processor 121 of node 112. A modified FIO list 322 of the second FR message 602 starts with second FIO 402, which comprises forwarding instructions that are specific to node 113.

By removing first FIO 401, node 112 generates second FR message 602 that is shorter than first FR message 300, which has been received by node 112. Shorter second FR message 602 allows for faster reading of second FR message 602 at the next node of the protection detour path 101. The next node, such as, for example, node 113, when reading the second FR message 602 reads second FIO 402, which is now located on the first position of the modified FIO list 322.

Node 112 also updates FR message length value 302 in the second FR message 602. The value of the number of FIOs 321 in second FR message 602 is also updated by node 112 to be (n−1).

The FR message 300 is copied by processor 121 of node 112, and the second FR message 602 is forwarded to the next node 113.

After the second FR message 602 is forwarded to the next node 113 of the protection detour path 101, first FR message 300 (or a local copy of message FR message 300) may be processed by node 112. Transmission of second FR message 602 before processing of the first FR message 300, and then subsequent or simultaneous processing of first FR message 300 by node 112 permits reducing time of propagation of the FR message in the protection detour path 101 and therefore shorten the restoration time of the network.

Processing of the FR message 300 by node 112 may comprise reading the LSPOs 500 which corresponds to node 112 in the FR message 300, and using the data of LSPO 500 to establish data path via node 112 by restoring (in other words, establishing) cross connects at node 112.

The cross connects (which may be also referred to as "cross connections") on each node along the protection detour path 101 may be programmed (set-up) in parallel. In other words, a path between an input port and an output port of each node, which is a sub-segment of the LSP on the node, may be programmed to transmit the FR message approximately simultaneously with processing of the FR message. In yet other words, the processing of the FR message and transmission of the FR message inside the node via cross connect is not sequential. In at least one embodiment, the LSP data received in the FR message by the node comprises instructions how to set-up the cross connects on that node.

Each node may process the FR message 300, 602, 603, 604, respectively, after forwarding the corresponding modified message downstream to the next node of the protection detour path, so that the FR messages 300, 602, 603, 604 may be processed in parallel (non-sequentially) by the nodes of the protection detour path 101.

As described above, the FR message is forwarded via the message forwarding path 103 specified by the forwarding instructions in the FR message 300, and is delivered to each node that is located on the protection detour path 101. Despite the slow routing convergence in case of the network failure, forwarding instructions in the FR message 300 help the FR message to follow the message forwarding path 103 and not to be lost.

It should be understood that one node may be configured to generate FR message 300 and copy, forward, and process it as described herein. Referring to FIG. 1, node 112 may also, in case of a network failure, determine a protection detour path, and generate another FR message based on a plurality of FIOs and a plurality of LSPOs. In other words, any node of a network may be a source node, and may generate the FR message, and may be a source node of a message forwarding path.

Figure 7:
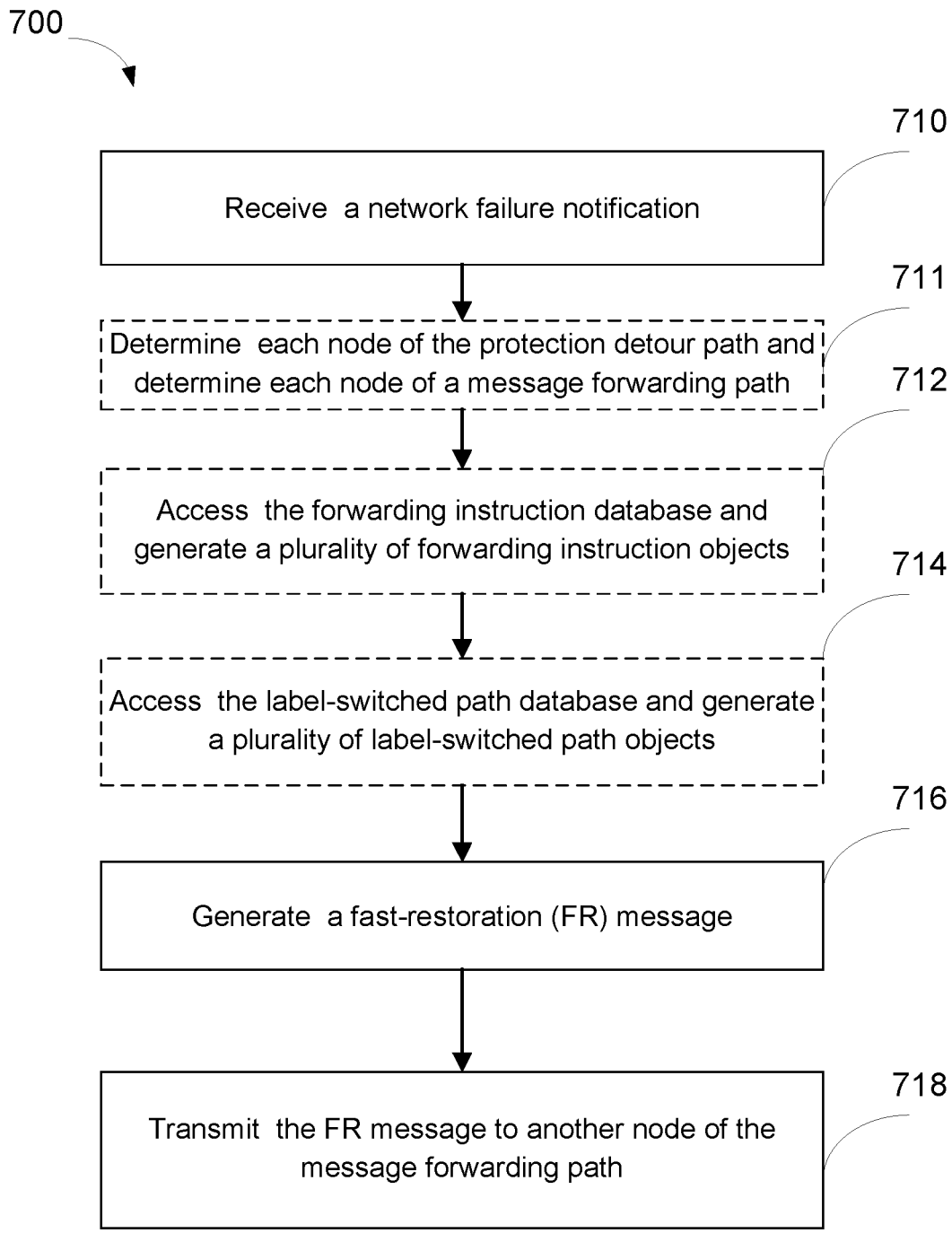
FIG. 7 depicts a method for network restoration, in accordance with various embodiments of the present disclosure.

FIG. 7 depicts a method for network restoration, in accordance with various embodiments of the present disclosure. When describing FIG. 7, reference will also be made to FIGS. 1-6.

The method 700 may be implemented on a source node 111 of the protection detour path 101.

At step 710, source node 111 receives LSP failure notification 201. At step 711, processor 121 of source node 111 may determine each node of the protection detour path 101 and determine each node of the message forwarding path 103. In some embodiments, source node 111 may send a request to determine each node of the protection detour path 101 and to determine each node of the message forwarding path 103, and receive such data subsequently. Nodes of the message forwarding path 103 comprise nodes of the protection detour path 101.

At step 712, processor 121 of source node 111 may access the forwarding instruction database and may generate a plurality of FIOs 400. At step 714, the node's processor may access the LSP database and generate a plurality of LSPOs 500.

In some embodiments, the plurality of FIOs 400 and/or the plurality of LSPO 500 may be generated by processor 121 in real time, in response to receiving LSP failure notification 201.

At step 716, processor 121 of source node 111 generates FR message 300. As described above, the FR message comprises: a plurality of FIOs having forwarding instructions related to each node of a message forwarding path; and a plurality of LSPOs having a restoration LSP data for each node of the protection detour path. In at least one embodiment, the FR message may further comprise: a header comprising a FR message length value, a FR message type identifier, and a FR message version identifier. The FR message may further comprise a value of a number of FIOs of the plurality of FIOs; and a value of a number of LSPOs of the plurality of LSPOs.

In at least one embodiment, each FIO of the plurality of FIOs of the FR message comprises an action flag indicating whether the data of FR message should be processed by each node of the message forwarding path. Each FIO of the plurality of FIOs of the FR message may comprise: a FIO length value, a FIO type identifier, and a forwarding label. The number of FIOs in the FR message may be equal to a number of the nodes in the message forwarding path.

The number of LSPOs may be equal to a number of LSPs to be restored at each node of the protection detour path. Each LSPO of the plurality of LSPOs of the FR message may comprise: an LSPO length value, an LSPO type identifier, and a restoration LSP data.

At step 718, processor 121 of source node 111 transmits the FR message 300 to another node of protection detour path 101. Referring also to FIG. 1, for example, source node 111 may transmit FR message 300 to node 112 of protection detour path 101.

Figure 8:
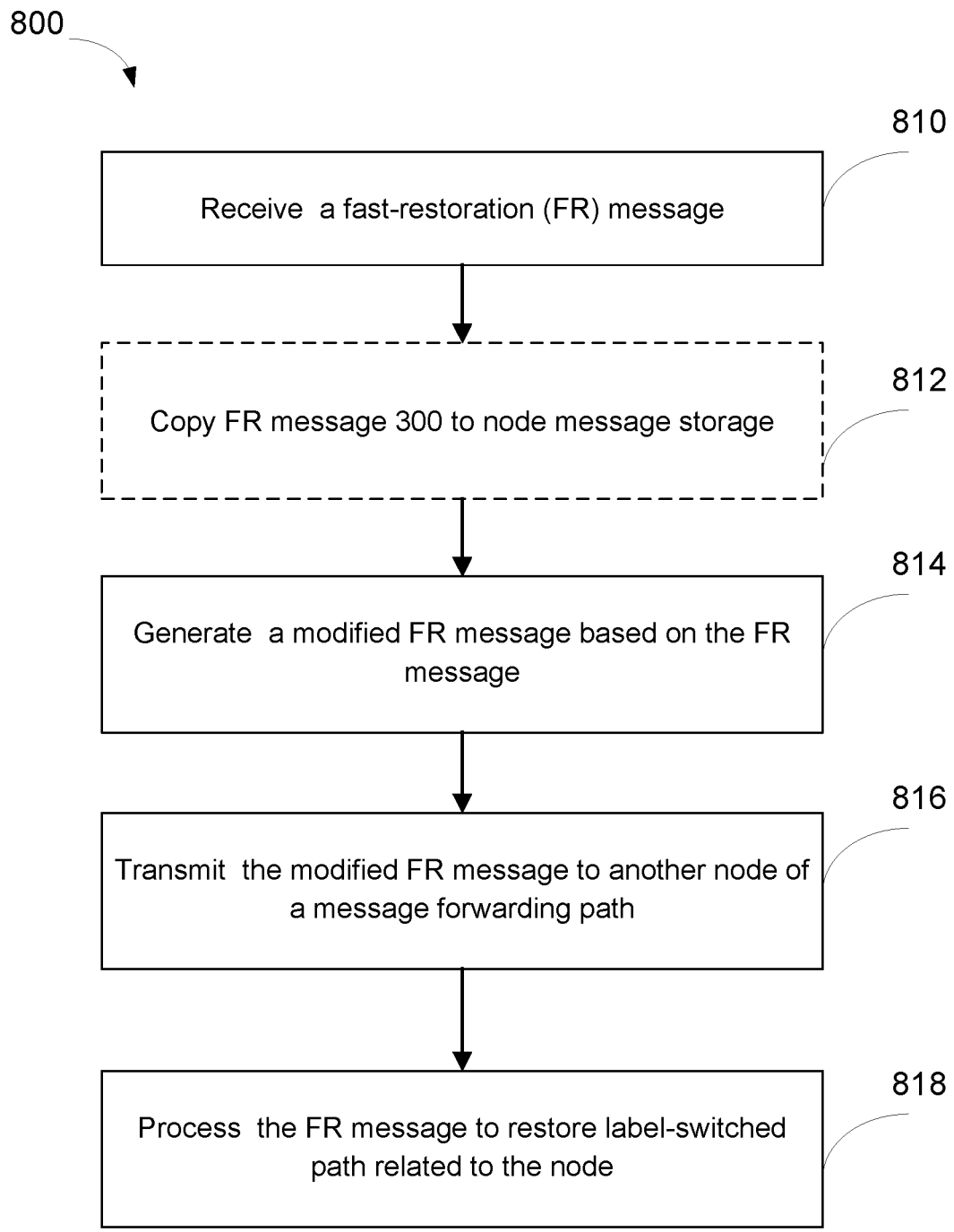
FIG. 8 depicts another method for network restoration, in accordance with various embodiments of the present disclosure.

FIG. 8 depicts another method 800 for network restoration, in accordance with various embodiments of the present disclosure. When describing FIG. 8, reference will also be made to FIGS. 1-6.

For example, method 800 may be implemented on node 112 of the protection detour path 101.

At step 810, node 112 receives FR message 300.

At step 812, FR message 300 may be copied to node message storage 613. The node message storage may be a temporary memory storage.

At step 814, the processor 121 of node 112 generates modified FR message 601 by removing, from FR message 300, the forwarding label 414 related to node 112. The modified FR message also has an updated FR message length value and an updated value of a number of FIOs.

At step 816, the modified FR message 602 (also referred to herein as "second message 602") is transmitted to next node 113 of message forwarding path 103. The modified FR message 602 is transmitted based on the forwarding label related to node 112 and provided in FR message 300. In other words, the modified FR message is transmitted to another node of a message forwarding path 103 based on the first FIO in the plurality of FIOs related to the node 112 and located in the FR message 300.

At step 818, FR message 300 may be retrieved from the node message storage and processed at node 112 by processor 121 of node 112. As described above, the FR message has FIO. The FIO may comprise an action flag indicating whether the FR message should be processed by the node. The FR message is processed to restore LSPs related to the node 112 based on the restoration LSP data in the plurality of LSPOs in the FR message 300.

The processor reads LSP objects, decodes the LSP data and uses the LSP data to set up the cross-connections on the data plane. LSP path may be then established and the updated traffic may flow.

Figure 9:
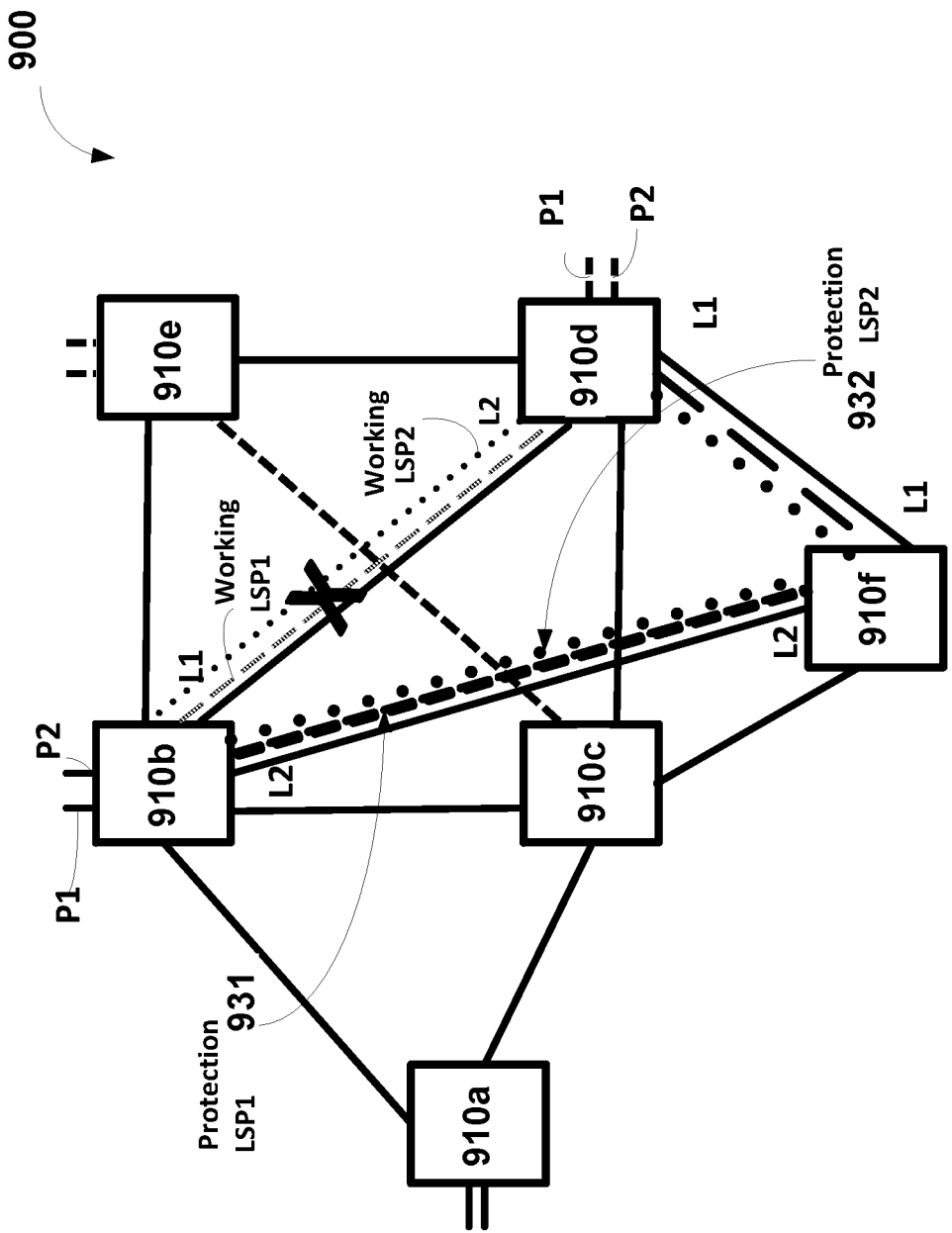
FIG. 9 depicts a non-limiting example of an optical network, in accordance with various embodiments of the present disclosure.

FIG. 9 depicts a non-limiting example of an optical network 900, in accordance with various embodiments of the present disclosure. The optical network 900 has 6 wavelength switching nodes 910a, 910b, 910c, 910d, 910e, 910f. Each node has transponder ports. For example, nodes 910b or 910d have ports P1 and P2. FIG. 9 depicts also links between nodes, for example, link "node 910b (L1)⇔node 910d (L2)" connects node 910b and node 910d.

For example, two tunnels may be generated using GMPLS RSVP-TE PATH/RESV messages. Referring to FIG. 9, Tunnel1 has a working LSP "LSP1" (depicted with dashed lines) using wavelength w1. Tunnel2 has a working LSP "LSP2" (depicted with dots) using wavelength w2. Tunnel1 and Tunnel2 use different transponder ports but share the same link on a network side.

In FIG. 9, a route of working LSP LSP1 may be expressed as follows: node 910b w1 cross-connect P1×L1, node 910d w1 cross-connect L2×P1, where P1 refers to P1 transponder port of the respective node, L1 and L2 are optical link interfaces, and w1 refers to a cross-connect using first wavelength w1. In other words, the expression "node 910b w1 cross-connect P1×L1" refers to a cross-connect P1×L1 at first wavelength w1 at node 910b. Similarly, the expression "node 910d w1 cross-connect L2×P1" refers to a cross-connect L2×P1 at first wavelength w1 at node 910d.

The route of working LSP LSP2 may be expressed as follows: node 910b w2 cross-connect P2×L1, node 910d w2 cross-connect L2×P2, where P2 is P2 transponder port of the respective node, L1 and L2 are optical link interfaces, and w2 refers to a cross-connect using second wavelength w2.

In the event of a failure of the link "node 910b (L1) ⇔node 910d (L2)" of optical network 900, both Tunnel1 and Tunnel2 get affected and need to be restored as soon as possible.

Once one or more LSP failure notification, that inform of failure(s) of the working LSP(s), is received by source node 910b, the source node 910b may retrieve protection LSPs from database, if the protection LSPs have been pre-computed before the failure of the working LSP. Alternatively, the source node 910b may determine the protection LSPs. Alternatively, the source node 910b may request a Path Computing Engine (PCE) server to determine the protection LSPs in real time.

For example, the determined protection detour paths for each wavelength (also referred herein as "protection LSPs") may be expressed as follows. A route of protection LSP LSP1 may be: node 910b w1 cross-connect P1×L2, node 910f w1 cross-connect L2×L1, node 910d w1 cross-connect L1×P1. A route of protection LSP LSP2 may be: node 910b w2 cross-connect P2×L1, node 910f w2 cross-connect L2×L1, node 910d w2 cross-connect L1×P2.

Protection LSP LSP1 931 and protection LSP LSP2 932 share the same nodes 910b, 910f and 910d. Therefore, data related to two protection detour paths (protection LSP LSP1 and protection LSP LSP2), such as restoration LSP data for each node 910f, 910d of the protection LSPs LSP1 931, LSP2 932 may be grouped in a single FR message 300, as described above.

The source node 910b determines a message forwarding path of the FR message 300 based on the protection LSP LSP1 and protection LSP LSP2 in order to avoid any loss of the FR message 300 due to the link failure, and in order to ensure that all cross-connects are generated successfully on the nodes along the protection detour paths.

It should be understood that the message forwarding path may be different from protection LSP LSP1 and protection LSP LSP2.

FIG. 10 depicts examples of LSPOs that may be encoded for protection LSPs LSP1 and LSP2, in accordance with various embodiments of the present disclosure. FIG. 11 depicts alternative examples of LSPOs that may be encoded for protection LSPs LSP1 and LSP2, in accordance with various embodiments of the present disclosure.

If the two protection LSP cross-connects were not yet sent to or preconfigured on node 910d and node 910f, the FR message sent from the source node 910b may provide LSPOs 1001, 1002 depicted in FIG. 10 for the cross-connects of node 910d and node 910f.

Alternatively, the two protection LSPs may be pre-computed and protection LSP cross-connects may be sent to and preconfigured on node 910d and node 910f before the failure of the link "node 910b (L1)⇔node 910d (L2)". If the two protection LSPs have been pre-computed, FR message sent from source node 910b may comprise protection LSP global identifiers (ID), instead of various fields 1003 of LSPOs 1001, 1002 depicted in FIG. 10. FIG. 11 depicts alternative LSPOs 1101, 1102 with protection LSP global IDs 1103, 1104.

Figure 12:
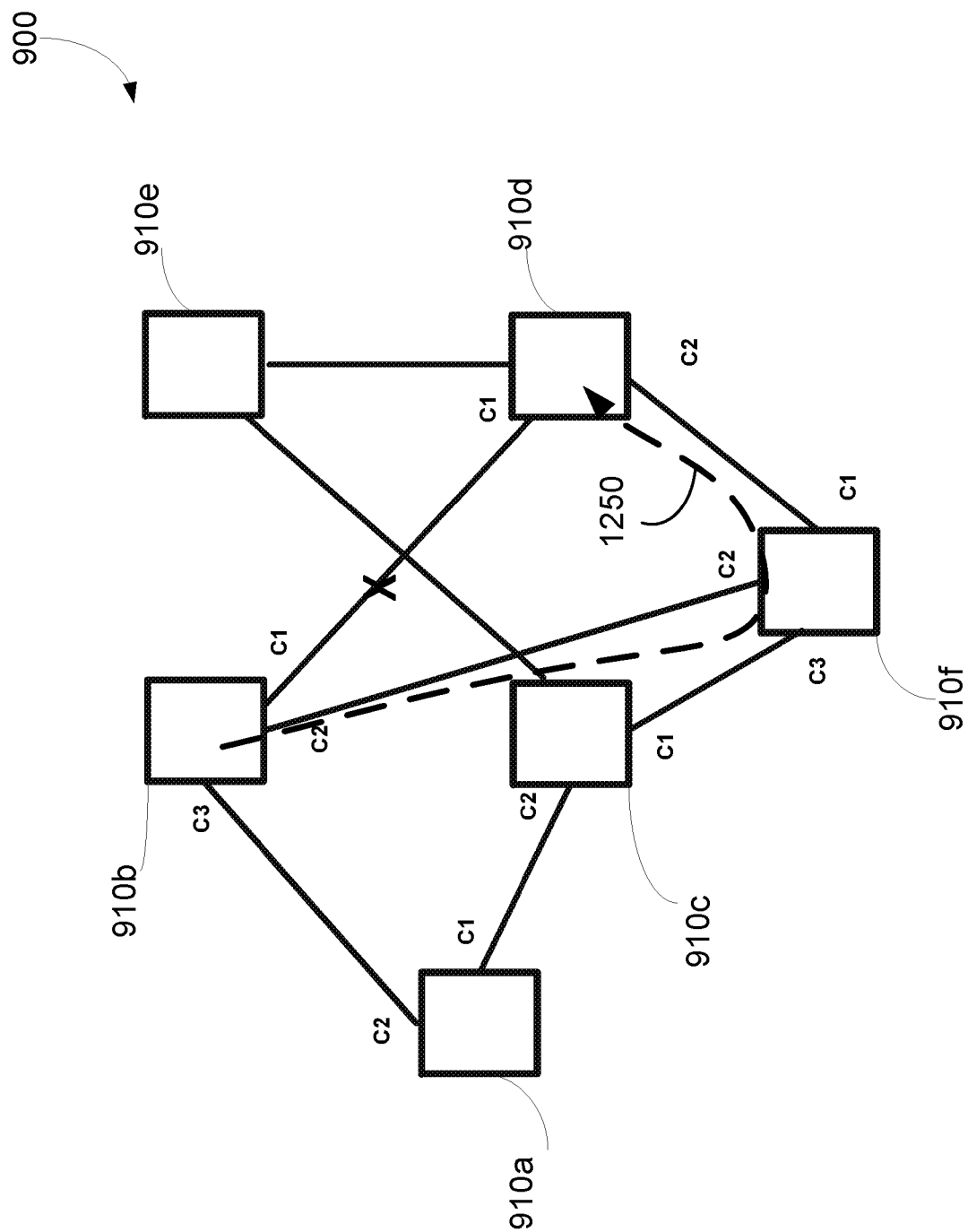
FIG. 12 depicts the optical network of FIG. 9 showing direct control channels between three nodes, in accordance with various embodiments of the present disclosure.

FIG. 12 depicts the optical network 900, with enabled optical supervisory channels (OSCs) and direct control channels between nodes 910b and 910f, and between node 910f and 910d. There are direct control channels between node 910b (control interface c2) and node 910f (control interface c2), and between node 910f (control interface c1) and node 910d (control interface c2). Signaling messages in the control plane may be sent over the OSC channels.

In FIG. 12, there is no failure of protection LSPs between nodes 910b and 910f, and between 910f and 910d. Therefore, forwarding of first FR message 300 in the control plane of network 900 follows the same path as the protection LSPs.

There is only one intermediate node 910f on the message forwarding path 1250. Therefore, first FR message 300 generated by node 910b has only one FIO.

FIG. 13 depicts an example of FIO 1300 of FR message 300 for node 910*f*, in accordance with various embodiments of the present disclosure. The first FR message 300 is generated by source node 910*b* and transmitted to node 910*f*. After receiving the first FR message 300, node 910*f* copies the first FR message 300 and generates a second FR message 602.

The second FR message 602, as described above, has the same fields as the first FR message 300 except for the FIO 1300. In other terms, to generate the second FR message, node 910*f* removes the FIO 1300 from the first FR message 300.

The node 910*f* forwards the second FR message 602 to node 910*d*, which is the last node of the message forwarding path 1250. After the second FR message 602 has been forwarded from node 910*f* to 910*d*, node 910*f* decodes the first FR message 300. To decode the first FR message 300, node 910*f* extracts the LSP data such as LSP fields 1003 or LSP global IDs 1103, 1104 depicted in FIGS. 10-11. Node 910*f* then programs the cross-connects between link L2 and link L1 for wavelengths w1 and w2.

Figure 14:
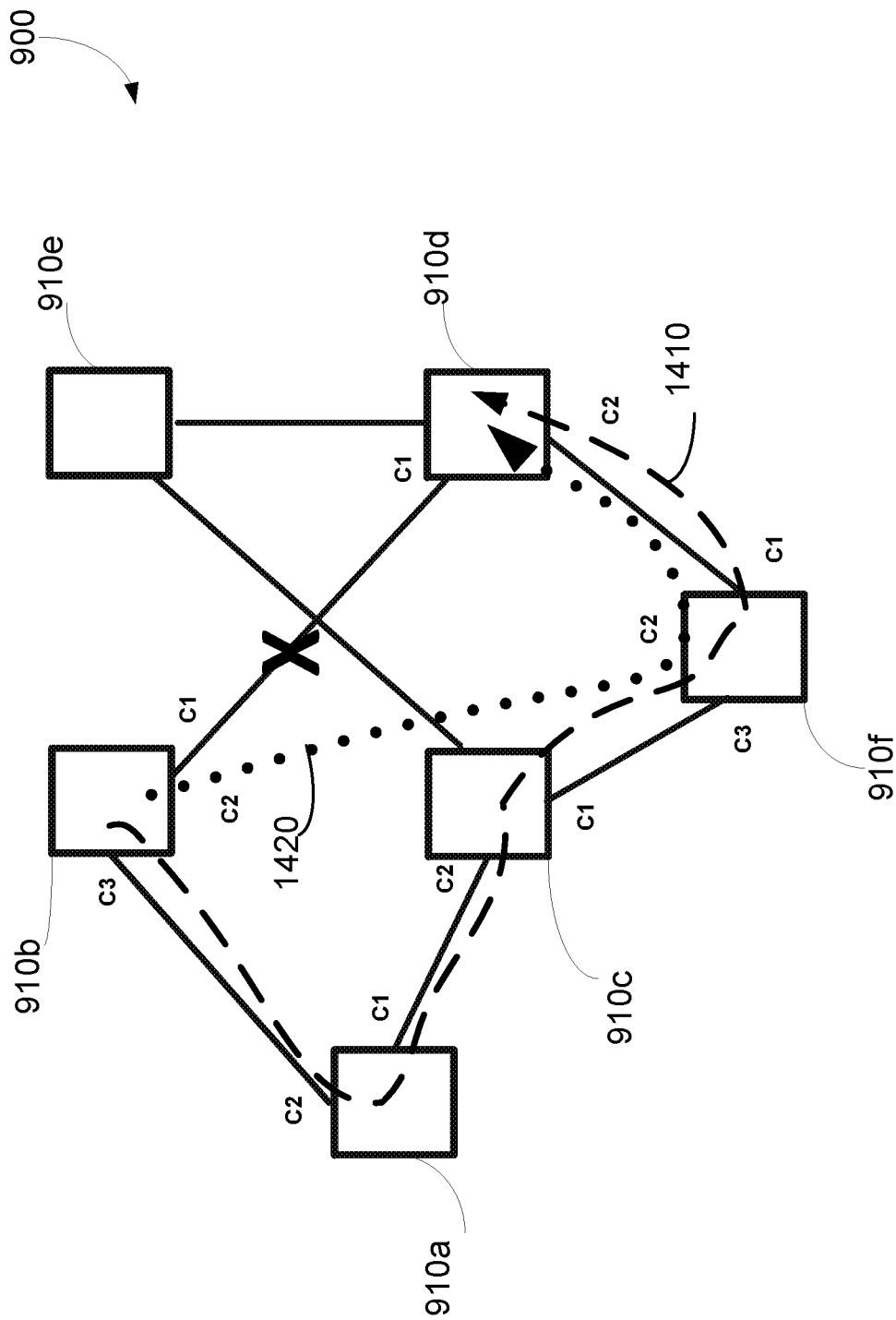
FIG. 14 depicts the optical network of FIG. 9 without direct control channels between two nodes, in accordance with various embodiments of the present disclosure.

FIG. 14 depicts the optical network 900 with OSCs enabled and no direct control channels between node 910*b* and 910*f*. For example, the control plane signaling messages may be sent over the OSC channels. Since there is no direct control channels between node 910*b* and 910*f* of the protection LSP route, node 910*b* routing table shows that the control interface c1 may be used for message forwarding to node 910*f* through node 910*d*. For example, this may be the shortest path between node 910*b* and node 910*d* in network 900. However, if the link between node 910*b* and node 910*d* fails, then the control interface c1 of node 910*b* should not be used. If the control interface c1 would be used, any transmitted message would be lost.

Therefore, in the event of the failure of the link between node 910*b* and node 910*d*, as depicted in FIG. 14, node 910*b* determines another viable path towards node 910*d*. For example, such viable path, which may be used for FR message transmission towards node 910*d*, may be forwarding path 1410 depicted in FIG. 14: node 910*b* (through control interface c3) to node 910*a* (through control interface c1) to node 910*c* (through control interface c1) to node 910*f* (through control interface c3) to node 910*d*.

FIG. 15A depicts a non-limiting example of a first FR message 1500*b* generated by node 910*b* of network 900, in accordance with various embodiments of the present disclosure.

Since there are 3 intermediate nodes 910*a*, 910*c*, 910*f* on the forwarding path 1410, FR message 1500*b* has three FIOs 1520*a*, 1520*c*, 1520*f* (referred to as "INSTRUCTION" in FR message 1500*b*). The three FIOs 1520*a*, 1520*c*, 1520*f* may be generated by the source node 910*b*.

The first two FIOs 1520*a*, 1520*c* have fields with action flags indicating "Forwarding" for nodes 910*a* and 910*c*, because nodes 910*a* and 910*c* are not on the protection detour path 1420 (also referred to as "Protection LSP route"). A third FIO 1520*f* has the action flag indicating "Copy+Forwarding" for node 910*f*, because node 910*f* is located on the protection detour path 1420, which only includes, in this non-limiting example, nodes 910*b*, 910*f*, and 910*d*.

In at least one non-limiting example, protection LSP routes may have been pre-computed for each link failure, and may be stored only at source node 910*b* for each tunnel. In such an example, upon receiving two network failure notifications indicating failure of working LSPs for two wavelengths w1 and w2, source node 910*b* may retrieve two protection LSPs from LSP database 126. Each one of two protection LSPs corresponds to a specific wavelength w1 or w2. In the non-limiting example of network 900, the protection LSPs for two wavelengths w1 and w2 share the same nodes 910*b*, 910*f*, 910*d*, and the two protection LSPs may be grouped in a single FR message 1500*b*, as described above.

FIG. 15B depicts a non-limiting example of a second FR message 1500*a* generated by node 910*a* of network 900, in accordance with various embodiments of the present disclosure. FIG. 15C depicts a non-limiting example of a third FR message 1500*c* generated by node 910*c* of network 900, in accordance with various embodiments of the present disclosure. FIG. 15D depicts a non-limiting example of a fourth FR message 1500*f* generated by node 910*f* of network 900, in accordance with various embodiments of the present disclosure.

After the FR message 1500*b* is sent out by node 910*b* to node 910*a*, node 910*b* may delete two old cross-connects: P1×L1 cross-connect using wavelength w1, and P2×L1 cross-connect using wavelength w2. Node 910*b* may then generate two new cross-connects: P1×L2 cross-connect using wavelength w1, and P2×L2 cross-connect using wavelength w2.

After two new cross-connects have been generated, node 910*b* may start a timer. The timer may count a delay of, for example, 5 seconds. After the timer times out (assuming the protection paths have been set up and data traffic is flowing), node 910*b* may send RSVP-TE PATH messages along the protection paths to synchronize control plane/RSVP soft states with the data plane.

Upon receiving of the FR message 1500*b* from node 910*b*, node 910*a* decodes the message and reads the first FIO 1520*a* in the list of FIOs (INSTRUCTION objects). The first FIO 1520*a* has an action flag indicating "Forwarding" and a forwarding label value "Outgoing Local Interface C1". In at least one non-limiting embodiment, the action flag "Forwarding" may indicate that node 910*a* does not need to copy and process message in order to replace cross-connects thereon. Node 910*a* removes the first FIO 1520*a* from the message body, updates the value of "Number of Instructions" field to have a value of "2" instead of "3", and updates the value of "Length" field (of the FR message) to be "96" instead of "104". Node 910*a* may thus generate a modified second FR message 1500*a* and then may send the second FR message 1500*a* out from a local control interface C1 of node 910*a* to node 910*c*.

Upon receiving of the second FR message 1500*a* from node 910*a*, node 910*c* decodes the second FR message 1500*a* and reads the first FIO in the list of FIOs. The first FIO in the list of FIOs of the second FR message 1500*a* is a second FIO 1520*c*. The value of the action flag field of second FIO 1520*c* is "Forwarding". The value of a "forwarding label" field of second FIO 1520*c* is "Outgoing Local Interface C1".

The action flag value of second FIO 1520*c* "Forwarding" may indicate that node 910*a* does not need to copy and process message further (for example, for provisioning cross-connects). In such example, node 910*c* removes second FIO 1520*c* from the second FR message 1500*a*, updates the value of "Number of Instructions" field to be "1" instead of "2", and updates the value of "Length" field to be 88 instead of 96. Node 910*c* thus generates a third FR message 1500*c* and sends the third FR message 1500*a* out from its local control interface C1.

Upon receiving the third FR message 1500*c* from node 910*c*, node 910*f* decodes the third FR message 1500*c* and reads the top FIO in the list of FIOs of third FR message 1500c: the third FIO 1520f. In FIG. 15C, the third FIO 1520f has an action flag field indicating "Copy+Forwarding". The value of the forwarding label is "Outgoing Local Interface C3".

In this non-limiting example, the action flag value of "Copy+Forwarding" of third FIO 1520f may indicate that node 910f needs to copy and process the third FR message 1500c further in order to restore cross-connects at the data plane. After the third FR message 1500c is copied, node 910f removes the third FIO 1520f. Node 910f may also remove data relative to two cross-connects for node 910f from the third FR message 1500c. Node 910f also updates the value of "Number of Instructions" field to be 0 instead of 1, and updates the value of "Length" field to be 56 instead of 88. Node 910f may thus generate a fourth FR message 1500f depicted in FIG. 15D. Node 910f then sends the generated fourth FR message 1500f to node 910d out from its local control interface C3.

After the fourth FR 1500f message is sent out to node 910d, node 910f validates the resource availability and generates two cross-connects on the data plane of node 910f. Based on the data received in the third FR message 1500c, node 910 may generate two cross-connects: (1) node 910f w1 cross-connect L2×L1, which refers to a cross-connect between links L2 and L1 using first wavelength w1, and (2) node 910f w2 cross-connect L2×L1, which refers to a cross-connect between links L2 and L1 using second wavelength w2.

After receiving the fourth FR message 910f from node 910f, node 910d decodes the message and determines that there is no FIO in the fourth FR message 910f. Absence of FIO indicates that there is no need to send an outgoing FR message from node 910d, because node 910d is a destination node of the protection detour path.

The received fourth FR message 1500f is then processed by node 910d. Based FR message 1500f, node 910d may validate the resource availability and delete two old cross-connects L2×P1 (with wavelength w1) and L2×P2 (with wavelength w2). Based on FR message 1500f, node 910d then generates two new cross-connects L1×P1 (with wavelength w1) and L1×P2 (with wavelength w2).

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A node comprising:
a non-transitory storage medium storing instructions; and
a processor configured to execute the instructions and, when executing the instructions, configured to:
receive a label-switched path (LSP) failure notification;
generate a fast-restoration (FR) message comprising:
a plurality of forwarding instruction objects (FIOs) having forwarding instructions related to each node of a message forwarding path, wherein a number of FIOs included in the FR message corresponds to a number of the nodes of the message forwarding path; and
a plurality of label-switched path objects (LSPOs) having a restoration label-switched path (LSP) data for each node of a protection detour path, nodes of the message forwarding path comprising nodes of the protection detour path; and
transmit the FR message to another node of the message forwarding path.

2. The node of claim 1, wherein each FIO of the plurality of FIOs comprises an action flag indicating whether the data of FR message should be processed by each node of the message forwarding path.

3. The node of claim 1, wherein the processor is further configured to, prior to generating the FR message, determine each node of the protection detour path and determine each node of the message forwarding path.

4. The node of claim 1, wherein a number of LSPOs in the FR message is equal to a number of LSPs to be restored at each node of the protection detour path.

5. The node of claim 1, wherein the FR message further comprises:
a header comprising a FR message length value, a FR message type identifier, and a FR message version identifier;
a value of a number of FIOs of the plurality of FIOs; and
a value of a number of LSPOs of the plurality of LSPOs.

6. The node of claim 1, wherein each FIO of the plurality of FIOs comprises: a FIO length value, a FIO type identifier, a forwarding label, and an action flag.

7. The node of claim 1, wherein each LSPO of the plurality of LSPOs comprises: an LSPO length value, an LSPO type identifier, and a restoration LSP data.

8. The node of claim 1, wherein the node and the nodes of the protection detour path operate an optical network, the network being the optical network, and a number of LSPOs in the FR message is equal to a number of optical channels of the optical network.

9. A node comprising:
a non-transitory storage medium storing instructions and
a processor configured to execute the instructions and, when executing the instructions, configured to:
receive a fast-restoration (FR) message, the FR message comprising:
a plurality of forwarding instructions objects (FIOs) having a first forwarding instructions object (FIO), the first FIO having forwarding instructions of the FR message from the node to another node of a message forwarding path, wherein a number of the plurality of FIOs included in the FR message corresponds to a number of the nodes of the message forwarding path; and
a plurality of label-switched path objects (LSPOs), each LSPO having a restoration label-switched path (LSP) data for each node of a protection detour path, nodes of the message forwarding path comprising nodes of the protection detour path;
generate a modified FR message based on the FR message; and
transmit the modified FR message to another node of the message forwarding path based on the first FIO of located in the FR message.

10. The node of claim 9, wherein the processor is further configured to, after transmitting the modified FR message to another node of the message forwarding path:
process the FR message to restore LSPs related to the node based on the restoration LSP data in the plurality of the LSPOs.

11. The node of claim 9, wherein the processor is further configured to, prior to generating the modified FR message:

copy the FR message to a node message storage and, prior to processing the FR message, retrieve the FR message from the node message storage.

12. The node of claim 9, wherein the processor is further configured to generate the modified FR message by removing from the FR message the first FIO related to the node.

13. The node of claim 9, wherein the modified FR message comprises a modified plurality of FIOs, the modified plurality of FIOs excluding the first FIO.

14. A method comprising:
   receiving a fast-restoration (FR) message by a node of a network, the FR message comprising:
      a plurality of forwarding instruction objects (FIOs) having a first forwarding instructions object (FIO), the first FIO having forwarding instructions for the FR message from the node to another node of a message forwarding path, wherein a number of FIOs included in the FR message corresponds to a number of the nodes of the message forwarding path;
      a plurality of label-switched path objects (LSPOs) each LSPO having a restoration label-switched path (LSP) data for each node of a protection detour path, nodes of the message forwarding path comprising nodes of the protection detour path;
   generating a modified FR message based on the FR message; and
   transmitting the modified FR message to another node of the message forwarding path based on the FIO located in the FR message.

15. The method of claim 14, further comprising, after transmitting the modified FR message to another node of the message forwarding path:
   processing the FR message to restore LSPs related to the node based on the restoration LSP data in the plurality of LSPOs.

16. The method of claim 15, wherein processing of the FR message to restore the LSPs on the node further comprises establishing at least one cross-connect on a data plane of the node.

17. The method of claim 14, wherein the FR message comprises an action flag indicating whether the data of the FR message should be processed by the node after transmitting the modified FR message to another node.

18. The method of claim 14, further comprising copying the FR message to a node message storage prior to generating the modified FR message.

19. The method of claim 14, wherein generating the modified FR message further comprises removing, from the FR message, the first FIO related to the node.

* * * * *